US012629923B2

(12) United States Patent
Nakamura et al.

(10) Patent No.: US 12,629,923 B2
(45) Date of Patent: May 19, 2026

(54) MULTILAYER HOLLOW CONTAINER, METHOD FOR MANUFACTURING SAME, AND METHOD FOR MANUFACTURING REGENERATED POLYESTER

(71) Applicant: Mitsubishi Gas Chemical Company, Inc., Tokyo (JP)

(72) Inventors: Jin Nakamura, Kanagawa (JP); Takanori Miyabe, Kanagawa (JP); Takafumi Oda, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 266 days.

(21) Appl. No.: 18/272,275

(22) PCT Filed: Dec. 24, 2021

(86) PCT No.: PCT/JP2021/048296
§ 371 (c)(1),
(2) Date: Jul. 13, 2023

(87) PCT Pub. No.: WO2022/153844
PCT Pub. Date: Jul. 21, 2022

(65) Prior Publication Data

US 2024/0308189 A1 Sep. 19, 2024

(30) Foreign Application Priority Data

Jan. 15, 2021 (JP) ................................ 2021-005044

(51) Int. Cl.
*B32B 27/08* (2006.01)
*B32B 27/18* (2006.01)
(Continued)

(52) U.S. Cl.
CPC .............. *B32B 27/08* (2013.01); *B32B 27/18* (2013.01); *B32B 27/34* (2013.01); *B32B 27/36* (2013.01);
(Continued)

(58) Field of Classification Search
CPC ......... B32B 27/08; B32B 27/18; B32B 27/34; B32B 27/36; B32B 2250/24;
(Continued)

(56) References Cited

U.S. PATENT DOCUMENTS 4,535,901 A 8/1985 Okudaira et al.
2005/0032947 A1 2/2005 Takahashi et al.
(Continued)

FOREIGN PATENT DOCUMENTS

CN 1590439 A 3/2005
CN 101360601 A 2/2009
(Continued)

OTHER PUBLICATIONS

English machine translation for KR20180077071. (Year: 2018).*
(Continued)

*Primary Examiner* — Michael C Miggins
(74) *Attorney, Agent, or Firm* — Fitch, Even, Tabin & Flannery LLP

(57) ABSTRACT

Provided is a multilayer hollow container including: a polyester layer containing a polyester resin (X); and a polyamide layer containing a polyamide resin (Y) and a yellowing inhibitor (A) with the polyamide layer being an intermediate layer and being present from a ground contact portion to a position of from 10 to 70% of a height of the multilayer hollow container. Also provided are a method for manufacturing the multilayer hollow container, and a
(Continued)

method for manufacturing a recycled polyester, the method thereof including a step of recovering polyester from the multilayer hollow container.

20 Claims, 2 Drawing Sheets

(51) Int. Cl.
*B32B 27/34* (2006.01)
*B32B 27/36* (2006.01)
*B65D 1/02* (2006.01)
*C11D 3/395* (2006.01)

(52) U.S. Cl.
CPC .......... *B65D 1/0215* (2013.01); *C11D 3/3953* (2013.01); *B32B 2250/24* (2013.01); *B32B 2307/4026* (2013.01); *B32B 2439/60* (2013.01)

(58) Field of Classification Search
CPC ........ B32B 2307/4026; B32B 2439/60; B32B 2250/44; B32B 5/142; B32B 27/20; B65D 1/0215; C11D 3/3953; C08J 2377/00; C08J 2467/00; C08J 2477/00; C08J 3/226
See application file for complete search history.

(56) References Cited

U.S. PATENT DOCUMENTS

| | | | |
|---|---|---|---|
| 2010/0233401 | A1 | 9/2010 | Mitadera et al. |
| 2016/0001914 | A1 | 1/2016 | Yamamoto |
| 2017/0267436 | A1 | 9/2017 | Yamamoto et al. |
| 2018/0072844 | A1 | 3/2018 | Otsuka et al. |
| 2018/0273231 | A1 | 9/2018 | Yamamoto et al. |
| 2020/0047392 | A1 | 2/2020 | Miyabe et al. |
| 2020/0247988 | A1 | 8/2020 | Miyabe et al. |
| 2021/0046744 | A1 | 2/2021 | Miyabe et al. |
| 2021/0229404 | A1 | 7/2021 | Miyabe |
| 2021/0237414 | A1 | 8/2021 | Miyabe |

FOREIGN PATENT DOCUMENTS

| | | | |
|---|---|---|---|
| CN | 103998234 | A | 8/2014 |
| EP | 0734413 | A1 | 10/1996 |
| JP | 57-123051 | A | 7/1982 |
| JP | 63-294342 | A | 12/1988 |
| JP | 2004-359914 | A | 12/2004 |
| JP | 2010-254811 | A | 11/2010 |
| JP | 2014-069829 | A | 4/2014 |
| JP | 2014-114060 | A | 6/2014 |
| JP | 2015-024828 | A | 2/2015 |
| JP | 2016-78373 | A | 5/2016 |
| JP | 2016-198912 | A | 12/2016 |
| JP | 2017-56956 | A | 3/2017 |
| JP | 6168261 | B1 | 7/2017 |
| JP | WO2017/057463 | A1 | 10/2017 |
| JP | 2018-43773 | A | 3/2018 |
| JP | 2018-188177 | A | 11/2018 |
| JP | WO2017/150109 | A1 | 12/2018 |
| TW | 201441304 | A | 11/2014 |
| TW | 201613764 | A | 4/2016 |
| TW | 201945197 | A | 12/2019 |
| TW | 201945205 | A | 12/2019 |
| TW | 201945250 | A | 12/2019 |
| WO | 2016/027577 | A1 | 2/2016 |
| WO | 2017/057463 | A1 | 4/2017 |
| WO | 2017/150109 | A1 | 9/2017 |
| WO | 2019/208502 | A1 | 10/2019 |

OTHER PUBLICATIONS

English machine translation for WO2017150109. (Year: 2017).*
International Search Report for PCT/JP2021/048296, mailed Feb. 15, 2022, and English Translation submitted herewith (5 pages).
International Search Report for PCT/JP2021/029631, mailed Oct. 5, 2021, 4 pages.
International Search Report for PCT/JP2021/007014, mailed Apr. 27, 2021, 6 pages.
Written Opinion of the International Search Report for PCT/JP2021/003654, mailed Apr. 27, 2021; 3 pages.
International Search Report for PCT/JP2021/003654, mailed Apr. 27, 2021, 6 pages.

* cited by examiner

MULTILAYER HOLLOW CONTAINER, METHOD FOR MANUFACTURING SAME, AND METHOD FOR MANUFACTURING REGENERATED POLYESTER

CROSS-REFERENCE TO RELATED APPLICATIONS

This application is a U.S. national phase application filed under 35 U.S.C. § 371 of International Application Number PCT/JP2021/048296 filed Dec. 24, 2021, designating the United States, which claims priority from Japanese Application Number 2021-005044, filed Jan. 15, 2021.

FIELD OF THE INVENTION

The present invention relates to a multilayer hollow container, a method for manufacturing the same, and a method for manufacturing a recycled polyester.

BACKGROUND IN THE INVENTION

As a container for containing a reactive liquid such as a chlorine-based bleaching agent, a container made of a polyolefin such as polyethylene is primarily used. This is because the polyolefin basically has a molecular skeleton composed of hydrocarbon and does not have a highly reactive portion in the molecule, and therefore deterioration due to an alkali, hypochlorite or the like contained in the bleaching agent can be prevented.

Polyester resins, exemplified by polyethylene terephthalate (PET), have merits including excelling in appearance such as transparency and luster, and excelling in also mechanical performance, fragrance retention, gas barrier properties, and recyclability. Therefore, polyester resins are widely used in various packaging materials such as films, sheets, and hollow containers. However, polyester resins have an ester bond, and therefore when the container contains an alkaline chlorine-based bleaching agent, the container material is susceptible to hydrolysis, and the mechanical properties deteriorate during long-term storage.

Attempts have also been made to use polyester resins having excellent properties as described above in containers for chlorine-based bleaching agents. For example, Patent Document 1 discloses a container for a chlorine-based liquid bleaching agent composition, the container being formed from a resin composition containing specific amounts of a polyester resin and a specific polyamide resin for the purpose of improving transparency and suppressing cracks.

Meanwhile, polyamide resins such as polyxylylene adipamide are used in particular to improve the gas barrier properties of containers, but in a polyester resin composition containing a polyamide, yellowing due to heat history is more likely to proceed than with a polyester alone. As a result, yellowing occurs particularly in a recycling process in which containers are collected and the resin is reused. This is a factor that reduces the product value of packaging containers, and thus measures for suppressing yellowing are being investigated. For example, Patent Document 2 discloses a multilayer container including a polyester resin composition layer containing a polyester resin and an amino group-containing compound having a yellowing-suppression capability, and a polyamide resin layer containing a polyamide resin, and also discloses a method for manufacturing recycled polyester.

CITATION LIST

Patent Document

Patent Document 1: WO 2017/150109
Patent Document 2: WO 2017/057463

SUMMARY OF INVENTION

When a reactive liquid such as a chlorine-based bleaching agent is contained in a container having a polyester resin as a main base material, problems occur including a deterioration in mechanical properties as described above and the formation of cracks or the like in the container. With the container disclosed in Patent Document 1, cracks can be suppressed to some extent, but higher resistance to a bleaching agent or the like is required.

A problem with the multilayer container produced by the manufacturing method of Patent Document 2 is that although it is a gas barrier container and yellowing of the recycled polyester are suppressed, there is room for improvement in delamination resistance (peeling resistance) in response to impact or the like, and a relatively large amount of a yellowing inhibitor must be used.

Therefore, a demand exists for a container that maintains mechanical properties when stored for a long period of time in a state of containing a bleaching agent or the like, does not undergo delamination even when subjected to impact or the like, and is configured such that when the polyester used for the container is recycled, a recycled polyester with minimal yellowing can be produced.

Therefore, an object of the present invention is to provide a multilayer hollow container that exhibits resistance to a reactive liquid such as a bleaching agent, achieves, in particular, both cracking resistance and delamination resistance, suppresses yellowing of a recycled polyester when recycled, and from which a recycled polyester with suppressed changes in hue can be produced, and to also provide a method for manufacturing the multilayer hollow container and a method for manufacturing a recycled polyester in which hue changes are suppressed.

As a result of a diligent investigation in view of the above-described problems, the present inventors discovered that a multilayer hollow container having a polyester layer and, as an intermediate layer in a specific portion, a polyamide layer containing a yellowing inhibitor can solve the problems described above, and thereby the present inventors arrived at the present invention.

The present invention provides the following aspects [1] to [24].

[1] A multilayer hollow container including:

a polyester layer containing a polyester resin (X); and a polyamide layer containing a polyamide resin (Y) and a yellowing inhibitor (A), the polyamide layer being an intermediate layer, and the polyamide layer being present from a ground contact portion to a position of from 10 to 70% of a height of the multilayer hollow container.

[2] The multilayer hollow container according to [1], wherein the polyamide layer is substantially continuously present at least from the ground contact portion to a position of 10% of the height of the multilayer hollow container.

[3] The multilayer hollow container according to [1] or [2], wherein the polyamide resin (Y) includes a constituent unit derived from a diamine and a constituent unit derived from a dicarboxylic acid, 80 mol % or more of the constituent unit derived from a diamine being a constituent unit derived from xylylene diamine, and 80 mol % or more of the constituent unit derived from a dicarboxylic acid being a constituent unit derived from adipic acid.

[4] The multilayer hollow container according to any one of [1] to [3], wherein the content of the polyamide resin (Y) is from 0.05 to 7.0 mass % relative to a total amount of all polyamide layers and all polyester layers.

[5] The multilayer hollow container according to any one of [1] to [4], wherein the polyester resin (X) includes a constituent unit derived from a dicarboxylic acid and a constituent unit derived from a diol, 80 mol % or more of the constituent unit derived from a dicarboxylic acid being a constituent unit derived from terephthalic acid, and 80 mol % or more of the constituent unit derived from a diol being a constituent unit derived from ethylene glycol.

[6] The multilayer hollow container according to any one of [1] to [5], wherein the yellowing inhibitor (A) is at least one selected from the group consisting of dyes and pigments.

[7] The multilayer hollow container according to any one of [1] to [6], wherein the yellowing inhibitor (A) is an anthraquinone-based dye.

[8] The multilayer hollow container according to any one of [1] to [7], wherein the content of the yellowing inhibitor (A) is from 1 to 30 ppm relative to the total amount of all polyamide layers and all polyester layers.

[9] The multilayer hollow container according to any one of [1] to [8], wherein the polyamide layer further contains a greening inhibitor (B).

[10] The multilayer hollow container according to [9], wherein the greening inhibitor (B) is at least one selected from the group consisting of anthraquinone-based dyes and azo-based dyes.

[11] The multilayer hollow container according to any one of [1] to [10], wherein the multilayer container has a 3 to 5 layer structure.

[12] A bleaching agent article having a chlorine-based liquid bleaching agent composition accommodated in the multilayer hollow container described in any one of [1] to [11].

[13] The bleaching agent article according to [12], wherein the chlorine-based liquid bleaching agent composition contains from 0.5 to 15 mass % of sodium hypochlorite.

[14] The bleaching agent article according to or [13], wherein the chlorine-based liquid bleaching agent composition contains a surfactant.

[15] The bleaching agent article according to any one of to [14], wherein the chlorine-based liquid bleaching agent composition contains an alkaline agent.

[16] A method for manufacturing a multilayer hollow container including a polyester layer containing a polyester resin (X), and a polyamide layer containing a polyamide resin (Y) and a yellowing inhibitor (A), the polyamide layer being an intermediate layer, and the polyamide layer being present from a ground contact portion to a position of from 10 to 70% of a height of the multilayer hollow container, and the manufacturing method includes:

a step 1 of mixing a polyamide resin (Y) and a yellowing inhibitor (A) to prepare a polyamide resin mixture;

a step 2 of co-injection molding the polyamide resin mixture and a polyester resin composition containing a polyester resin (X) to produce a multilayer preform; and a step 3 of blow molding the multilayer preform.

[17] The method for manufacturing a multilayer hollow container according to [16], wherein in the step 1, the polyamide resin (Y) having a pellet shape and the yellowing inhibitor (A) are mixed at a temperature of 230° C. or lower.

[18] The method for manufacturing a multilayer hollow container according to or [17], wherein in the step 1, a greening inhibitor (B) is further mixed.

[19] The method for manufacturing a multilayer hollow container according to any one of to [18], wherein in the step 1, a polyamide resin or a polyester resin and the yellowing inhibitor (A) are kneaded and then mixed with the polyamide resin (Y).

[20] The method for manufacturing a multilayer hollow container according to or [19], wherein in the step 1, a polyamide resin or a polyester resin, the yellowing inhibitor (A), and the greening inhibitor (B) are kneaded, and then mixed with the polyamide resin (Y).

[21] A method for manufacturing a recycled polyester, the method including recovering polyester from the multilayer hollow container described in any one of [1] to [11].

[22] The method for manufacturing a recycled polyester according to [21], the method including removing all or a portion of the polyamide layer from the multilayer hollow container and recovering the polyester.

[23] The method for manufacturing a recycled polyester according to [22], wherein the polyamide layer is removed by air elutriation after the multilayer hollow container is ground.

[24] The method for manufacturing a recycled polyester according to any one of to [23], wherein at least one step selected from the group consisting of crystallization and solid phase polymerization is implemented after recovering the polyester.

According to the present invention, provided are a multilayer hollow container that exhibits resistance to a reactive liquid such as a bleaching agent, achieves, in particular, both cracking resistance and delamination resistance, suppresses yellowing of a recycled polyester when recycled, and from which a recycled polyester with suppressed changes in hue can be produced. Also provided are a method for manufacturing the multilayer hollow container and a method for manufacturing a recycled polyester in which hue changes are suppressed.

DESCRIPTION OF EMBODIMENTS

[Multilayer Hollow Container]

Figure 1:
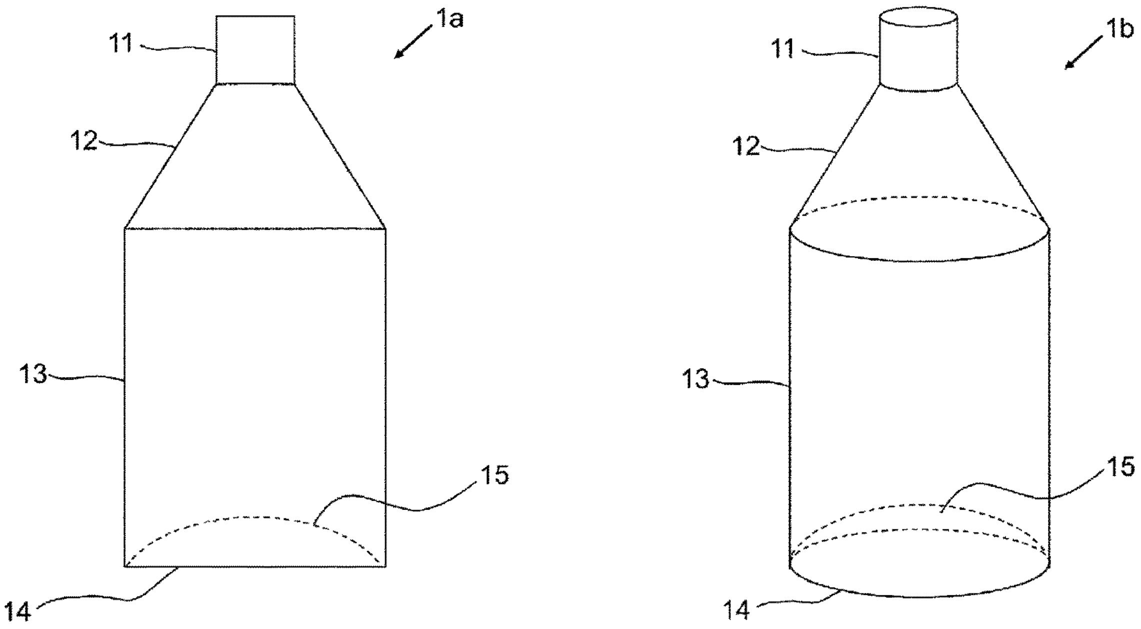
FIG. 1 is a side view and a perspective view illustrating an embodiment of a multilayer container (in which the bottom surface is concave) of the present invention.

A multilayer hollow container of the present invention includes a polyester layer containing a polyester resin (X), and a polyamide layer containing a polyamide resin (Y) and a yellowing inhibitor (A), and the polyamide layer is an intermediate layer and is present from a ground contact portion to a position of from 10 to 70% of a height of the multilayer hollow container.

<Polyester Layer>

The polyester layer contains a polyester resin (X).

(Polyester Resin (X))

The polyester resin (X) contained in the polyester layer is preferably a polycondensation polymer of a dicarboxylic acid and a diol, and preferably includes a constituent unit derived from a dicarboxylic acid (hereinafter, also referred to as a "dicarboxylic acid unit") and a constituent unit derived from a diol (hereinafter, also referred to as a "diol unit").

Examples of dicarboxylic acid units include constituent units derived from aromatic dicarboxylic acids, constituent units derived from alicyclic dicarboxylic acids, and constituent units derived from aliphatic dicarboxylic acids, and constituent units derived from aromatic dicarboxylic acids are preferred.

Examples of aromatic dicarboxylic acids include terephthalic acid, isophthalic acid, orthophthalic acid, biphenyl dicarboxylic acid, diphenyl ether dicarboxylic acid, diphenylsulfone dicarboxylic acid, diphenylketone dicarboxylic acid, 2,6-naphthalene dicarboxylic acid, 1,4-naphthalene dicarboxylic acid, and 2,7-naphthalene dicarboxylic acid. From perspectives of cost and manufacturing ease, terephthalic acid, isophthalic acid, orthophthalic acid, naphthalene dicarboxylic acid, and 4,4'-biphenyl dicarboxylic acid are preferable, and terephthalic acid, isophthalic acid, and naphthalene dicarboxylic acid are more preferable, and from the perspective of moldability, terephthalic acid and isophthalic acid are further preferable, and terephthalic acid is even more preferable.

Note that as the aromatic dicarboxylic acid, a $C_{1-4}$ alkyl ester of an aromatic dicarboxylic acid may be used.

When the multilayer hollow container of the present invention is to be recycled, the multilayer hollow container may be melt-kneaded with a typical monolayer container made of a polyester resin. Since the multilayer hollow container of the present invention includes a unit derived from terephthalic acid as a dicarboxylic acid unit, miscibility of the multilayer hollow container with a typical monolayer container is favorable, and good recyclability is achieved.

As the aromatic dicarboxylic acid, a sulfophthalic acid and a metal sulfophthalate may be used. The metal sulfophthalate is a metal salt of a sulfophthalic acid, and examples of the metal atom include alkali metals and alkaline earth metals.

Specifically, the sulfophthalic acid and metal sulfophthalate are represented by the following formulas (I) and (I'), respectively.

(I)

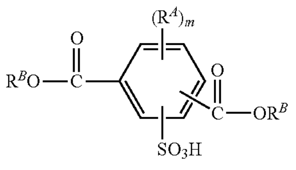

(I')

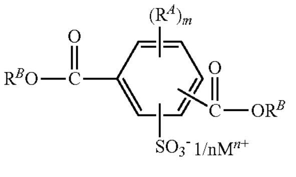

In formula (I') above, M is a metal atom, and n denotes the valence of M.

Examples of the metal atom M include alkali metals such as lithium, sodium, and potassium; and alkaline earth metals such as beryllium, magnesium, calcium, and strontium. Of these, an alkali metal is preferable, in which sodium or lithium is preferable, and sodium is more preferable. Note that when n is 2 or greater, crosslinking with other units (for example, sulfo groups in other sulfophthalic acid units or metal sulfophthalate units) through M may occur.

In formulas (I) and (I') above, $R^A$ is a substituted or unsubstituted alkyl group or a substituted or unsubstituted aryl group. m denotes an integer of 0 to 3. Note that when m is 2 or 3, each $R^A$ may be the same or different.

Examples of the alkyl group include a methyl group, ethyl group, n-propyl group, isopropyl group, n-butyl group, t-butyl group, n-octyl group, and 2-ethylhexyl group. Among these, a $C_{1-6}$ alkyl group is preferable, and a $C_{1-4}$ alkyl group is more preferable.

Examples of the aryl group include a phenyl group and a naphthyl group. Among these, a $C_{6-12}$ aryl group is preferable, and a phenyl group is more preferable.

Examples of the substituents possessed by the alkyl group and the aryl group include halogen atoms such as a chlorine atom, a bromine atom, or an iodine atom, an alkyl group, alkenyl group, aryl group, cyano group, hydroxyl group, nitro group, alkoxy group, aryloxy group, acyl group, amino group, mercapto group, alkylthio group, and an arylthio group. Among these groups, those having a hydrogen atom may be further substituted with the substituents described above.

Specific examples of the $R^A$ include a methyl group, ethyl group, n-propyl group, isopropyl group, n-butyl group, t-butyl group, 1-methylpropyl group, 2-methylpropyl group, hydroxymethyl group, 1-hydroxyethyl group, mercaptomethyl group, methyl thioethyl group, phenyl group, naphthyl group, biphenyl group, benzyl group, and 4-hydroxybenzyl group. Of these, a methyl group, ethyl group, and benzyl group are preferable.

In formulas (I) and (I') above, $R^B$ denotes a hydrogen atom or a $C_{1-4}$ alkyl group.

The preferred $R^A$ is as described above, but the sulfophthalic acid or metal sulfophthalate used in the polyester resin (X) is preferably a unit represented by the following formula (Ia) or (I'a), respectively, in which m=0, or in other words, the benzene ring is not substituted by $R^A$.

(Ia)

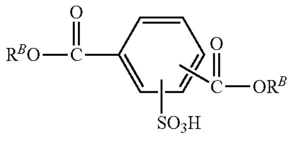

(I'a)

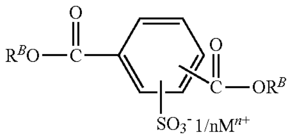

In formula (Ia) above, $R^B$ is the same as $R^B$ in formula (I).

Moreover, in formula (I'a) above, $R^B$, M, and n are the same as the $R^B$, M, and n in formula (I').

Furthermore, examples of the sulfophthalic acid represented by formula (Ia) or the metal sulfophthalate represented by formula (I'a) include phthalic acid structures in which two —CO— are bonded at the ortho position, isophthalic acid structures in which two —CO— are bonded at the meta position, and terephthalic acid structures in which two —CO— are bonded at the para position. Among these, an isophthalic acid structure is preferable. In other words, the sulfophthalic acid or metal sulfophthalate is preferably at least one of a sulfoisophthalic acid represented by formula (Ib) below or a metal sulfoisophthalate represented by formula (I'b) below.

(Ib)

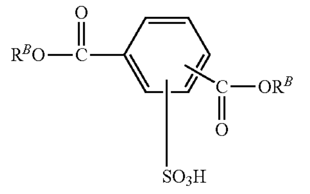

(I'b)

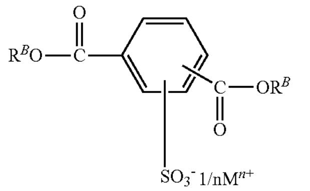

In formula (Ib) above, $R^B$ is the same as $R^B$ in formula (I). Moreover, in formula (I'b) above, $R^B$, M, and n are the same as the $R^B$, M, and n in formula (I').

The position of the sulfo group in the sulfoisophthalic acid or the metal sulfoisophthalate may be the 2-, 4-, 5-, and 6-positions, but is preferably substituted at the 5-position as represented by the following formula (Ic) or (I'c).

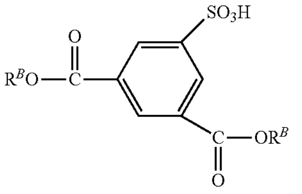

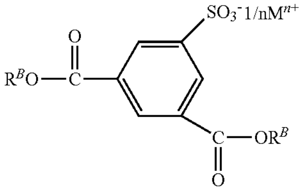

In formula (Ic) above, $R^B$ is the same as $R^B$ in formula (I). In formula (I'c) above, $R^B$, M, and n are the same as the $R^B$, M, and n in formula (I').

In the polyester resin (X), examples of the sulfoisophthalic acid represented by formula (Ic) or the metal sulfoisophthalate represented by formula (I'c) include 5-sulfoisophthalic acid, sodium 5-sulfoisophthalate, lithium 5-sulfoisophthalate, potassium 5-sulfoisophthalate, calcium bis(5-sulfoisophthalate), sodium dimethyl 5-sulfoisophthalate, and sodium diethyl 5-sulfoisophthalate.

In a case where the polyester resin (X) contains a constituent unit derived from at least one selected from the group consisting of sulfophthalic acids and metal sulfophthalates, the resin preferably contains at least a constituent unit derived from a metal sulfophthalate. The content of the constituent units derived from a sulfophthalic acid and a metal sulfophthalate in the polyester resin is preferably from 0.01 to 15 mol %, more preferably from 0.03 to 10.0 mol %, even more preferably from 0.06 to 5.0 mol %, and yet even more preferably from 0.08 to 2.0 mol %.

Examples of the alicyclic dicarboxylic acid include cyclohexane dicarboxylic acid, norbornene dicarboxylic acid, and tricyclodecane dicarboxylic acid.

Examples of the aliphatic dicarboxylic acid include malonic acid, succinic acid, adipic acid, azelaic acid, and sebacic acid.

Examples of the diol unit include constituent units derived from aliphatic diols, constituent units derived from alicyclic diols, and constituent units derived from aromatic diols, and constituent units derived from aliphatic diols are preferable.

Examples of the aliphatic diols include ethylene glycol, 2-butene-1,4-diol, trimethylene glycol, tetramethylene glycol, hexamethylene glycol, neopentyl glycol, methylpentanediol, and diethylene glycol. Among these, ethylene glycol is preferable.

Examples of the alicyclic diols include cyclohexane dimethanol, isosorbide, spiroglycol, 2,2,4,4-tetramethyl-1,3-cyclobutanediol, norbornene dimethanol and tricyclodecane dimethanol.

Examples of aromatic diols include bisphenol compounds and hydroquinone compounds.

The polyester resin (X) may have a constituent unit derived from a hydroxycarboxylic acid.

Examples of hydroxycarboxylic acids include aliphatic hydroxycarboxylic acids, alicyclic hydroxycarboxylic acids, and aromatic hydroxycarboxylic acids.

Examples of the aliphatic hydroxycarboxylic acids include 10-hydroxyoctadecanoic acid, lactic acid, hydroxyacrylic acid, 2-hydroxy-2-methylpropionic acid and hydroxybutyric acid.

Examples of the alicyclic hydroxycarboxylic acids include hydroxymethyl cyclohexane carboxylic acid, hydroxymethyl norbornene carboxylic acid, and hydroxymethyl tricyclodecane carboxylic acid.

Examples of the aromatic hydroxycarboxylic acids include hydroxybenzoic acid, hydroxytoluic acid, hydroxynaphthoic acid, 3-(hydroxyphenyl)propionic acid, hydroxyphenylacetic acid, and 3-hydroxy-3-phenylpropionic acid.

The polyester resin (X) may have a constituent unit derived from a monofunctional compound and a constituent unit derived from a polyfunctional compound.

Examples of the monofunctional compound include monocarboxylic acids and monoalcohols, and specifically include aromatic monocarboxylic acids, aliphatic monocarboxylic acids, aromatic monoalcohols, aliphatic monoalcohols, and alicyclic monoalcohols.

Examples of the polyfunctional compound include aromatic polycarboxylic acids, alicyclic polycarboxylic acids, aliphatic polyhydric alcohols, alicyclic polyhydric alcohols, and esters thereof.

The polyester resin (X) preferably has a constituent unit derived from a dicarboxylic acid containing a terephthalic acid-derived constituent unit, and a constituent unit derived from a diol containing an ethylene glycol-derived constituent unit; more preferably has a constituent unit derived from a dicarboxylic acid containing 80 mol % or greater of a terephthalic acid-derived constituent unit, and a constituent unit derived from a diol containing 80 mol % or greater of an ethylene glycol-derived constituent unit; even more preferably has a constituent unit derived from a dicarboxylic acid containing 90 mol % or greater of a terephthalic acid-derived constituent unit, and a constituent unit derived from a diol containing 90 mol % or greater of an ethylene glycol-derived constituent unit; and yet even more preferably has a constituent unit derived from a dicarboxylic acid containing 98 mol % or greater of a terephthalic acid-derived constituent unit, and a constituent unit derived from a diol containing substantially 100 mol % of an ethylene glycol-derived constituent unit.

Specific examples of the polyester resin (X) include polyethylene terephthalate (PET).

The polyethylene terephthalate (PET) may include a constituent unit derived from an aromatic dicarboxylic acid other than terephthalic acid. The aromatic dicarboxylic acid other than terephthalic acid is preferably one or more selected from isophthalic acid, orthophthalic acid, naphthalene dicarboxylic acid, and 4,4'-biphenyldicarboxylic acid. These compounds are inexpensive, and a copolymerized polyester resin containing these compounds is easily produced.

Among these, isophthalic acid and naphthalene dicarboxylic acid are preferable, and isophthalic acid is more preferable. The polyethylene terephthalate containing a constituent unit derived from isophthalic acid excels in moldability, and is also excellent from the standpoint of preventing whitening of a molded article due to the low crystallization rate. In addition, a polyethylene terephthalate containing a constituent unit derived from naphthalene dicarboxylic acid increases the glass transition point of the resin, improves the heat resistance, and absorbs ultraviolet rays, and therefore, such polyethylene terephthalate is suitably used in the manufacturing of a multilayer hollow container requiring resistance to ultraviolet rays. Note that a 2,6-naphthalene dicarboxylic acid component is preferable as the naphthalene dicarboxylic acid because it is easy to be produced and is highly economical.

When the polyethylene terephthalate contains a constituent unit derived from an aromatic dicarboxylic acid other than terephthalic acid, the proportion of the constituent unit derived from an aromatic dicarboxylic acid other than terephthalic acid is preferably from 1 to 20 mol %, more preferably from 1 to 10 mol %, and even more preferably from 1 to 5 mol % of the dicarboxylic acid units.

Note that one type of polyester resin (X) may be used alone, or two or more types may be combined and used.

The polyester resin (X) can be produced through a known method such as direct esterification or transesterification.

The intrinsic viscosity of the polyester resin (X) is preferably from 0.5 to 2.0 dL/g, and more preferably from 0.6 to 1.5 dL/g. When the intrinsic viscosity is 0.5 dL/g or higher, the mechanical properties of the container are excellent.

Note that the intrinsic viscosity is measured by dissolving the polyester resin in a mixed solvent of phenol/1,1,2,2-tetrachloroethane (=6/4 mass ratio) to prepare 0.2, 0.4, and 0.6 g/dL solutions, and then measuring the intrinsic viscosity at 25° C. using an automatic viscosity measuring apparatus (Viscotek, available from Malvern Instruments Limited).

(Other Components)

The polyester layer may contain other components. Examples of the other components include thermal stabilizers, photostabilizers, moisture-proof agents, waterproofing agents, lubricants, and spreading agents.

The polyester layer may contain, within a range that does not impair the effects of the present invention, a resin other than polyester resin (X) that is a main component. The content of the polyester resin (X) is preferably from 80 to 100 mass %, and more preferably from 90 to 100 mass %, relative to the amount of resin in the entire polyester layer.

<Polyamide Layer>

The polyamide layer includes a polyamide resin (Y) and a yellowing inhibitor (A).

By providing the polyamide layer, the multilayer hollow container of the present invention exhibits excellent resistance to a reactive liquid such as a bleaching agent, and particularly exhibits cracking resistance. Also, the polyester resin can be more easily separated and recovered while maintaining favorable moldability by using the polyamide layer.

Furthermore, it is conceivable that yellowing can be effectively suppressed by including the yellowing inhibitor (A) in a polyamide layer containing nitrogen, which is likely to cause yellowing of a recycled resin. In particular, it is conceivable that since an amount of the yellowing inhibitor corresponding to the amount of the polyamide resin remaining in the polyester resin recovered at the time of recycling remains, even when a pigment or dye, which are suitable yellowing inhibitors, is used in the present invention, an appropriate amount of the yellowing inhibitor can be contained in the recycled polyester resin, and a recycled polyester having small hue changes, which is particularly colorless, can be produced. Furthermore, although the resin amount is small, it is conceivable that because the yellowing inhibitor (A) is included in the polyamide layer formed throughout the entire container, yellowing can be efficiently suppressed even with a small amount of the yellowing inhibitor (A).

(Polyamide Resin (Y))

Examples of the polyamide resin (Y) include xylylene group-containing polyamide resins, nylon 6, nylon 66, nylon 666, nylon 610, nylon 11, nylon 12, and mixtures thereof. Of these, xylylene group-containing polyamide resins can improve resistance to a reactive liquid and can be easily separated from the polyester layer when recycled, and thus xylylene group-containing polyamide resins are preferable. The xylylene group-containing polyamide resin is preferably a polyamide resin containing a constituent unit derived from xylylene diamine.

The xylylene group-containing polyamide resin is produced by polycondensation of a dicarboxylic acid and a diamine containing a xylylene diamine, and includes a constituent unit derived from a xylylene diamine and a constituent unit derived from a dicarboxylic acid. Furthermore, the xylylene-group containing polyamide resin preferably contains at least 50 mol %, more preferably at least 70 mol %, even more preferably from 80 to 100 mol %, and yet even more preferably from 90 to 100 mol % of xylylene diamine-derived constituent units from amongst the diamine-derived constituent units (diamine units).

The xylylene diamine is preferably meta-xylylene diamine, para-xylylene diamine, or both, and is more preferably meta-xylylene diamine. Furthermore, preferably at least 50 mol %, more preferably at least 70 mol %, even more preferably from 80 to 100 mol %, and yet even more preferably from 90 to 100 mol % of the diamine units constituting the xylylene group-containing polyamide resin are constituent units derived from meta-xylylene diamine. When an amount of constituent units derived from meta-xylylene diamine in the diamine units is within the aforementioned range, the resistance of the polyamide resin to a reactive liquid is further improved.

The diamine unit in the xylylene group-containing polyamide resin may include only a constituent unit derived from xylylene diamine, or may include a constituent unit derived from diamines other than xylylene diamine. Here, examples of diamines other than xylylene diamine include, but are not limited to, aliphatic diamines having a linear or branched structure, such as ethylene diamine, tetramethylene diamine, pentamethylene diamine, 2-methylpentane diamine, hexamethylene diamine, heptamethylene diamine, octamethylene diamine, nonamethylene diamine, decamethylene diamine, dodecamethylene diamine, 2,2,4-trimethyl-hexamethylene diamine, and 2,4,4-trimethyl-hexamethylene diamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl) methane, 2,2-bis(4-aminocyclohexyl)propane, bis(aminomethyl)decalin, and bis(aminomethyl)tricyclodecane; and diamines having an aromatic ring, such as bis(4-aminophenyl)ether, paraphenylene diamine, and bis(aminomethyl) naphthalene.

Examples of compounds that can configure the dicarboxylic acid unit in the xylylene group-containing polyamide resin include $C_{4-20}$ α,ω-linear aliphatic dicarboxylic acids, such as succinic acid, glutaric acid, adipic acid, pimelic acid, suberic acid, azelaic acid, sebacic acid, undecanedioic acid, and dodecanedioic acid; alicyclic dicarboxylic acids, such as 1,4-cyclohexane dicarboxylic acid; other aliphatic dicarboxylic acids, such as dimer acids; and aromatic dicarboxylic acids such as terephthalic acid, isophthalic acid, orthophthalic acid, xylylene dicarboxylic acid, and naphthalene dicarboxylic acid, and $C_{4-20}$ α,ω-linear aliphatic dicarboxylic acids are preferable, adipic acid and sebacic acid are more preferable, and from the perspective of achieving favorable resistance to a reactive liquid, adipic acid is even more preferable.

Furthermore, the xylylene group-containing polyamide resin contains, of the dicarboxylic acid-derived constituent units (dicarboxylic acid units), adipic acid-derived constituent units at an amount of preferably at least 50 mol %, more preferably at least 70 mol %, even more preferably from 80 to 100 mol %, and yet even more preferably from 90 to 100 mol %.

In other words, the polyamide resin (Y) preferably includes a constituent unit derived from a diamine and a constituent unit derived from a dicarboxylic acid with 50 mol % or greater of the constituent unit derived from a diamine being a constituent unit derived from xylylene diamine and 50 mol % or greater of the constituent unit derived from a dicarboxylic acid being a constituent unit derived from adipic acid, and more preferably has a constituent unit derived from a diamine and a constituent unit derived from a dicarboxylic acid with 80 mol % or greater of the constituent unit derived from a diamine being a constituent unit derived from xylylene diamine and 80 mol % or greater of the constituent unit derived from a dicarboxylic acid being a constituent unit derived from adipic acid.

The xylylene diamine is preferably meta-xylylene diamine.

Furthermore, the remaining dicarboxylic acid units excluding adipic acid are preferably constituent units derived from $C_{4-20}$ α,ω-linear aliphatic dicarboxylic acids.

Furthermore, examples of the preferred xylylene group-containing polyamide resin are polyamide resins in which 70 mol % or greater of the diamine units are constituent units derived from xylylene diamine (preferably meta-xylylene diamine), from 70 to 99 mol % of the dicarboxylic acid units are constituent units derived from adipic acid, and from 1 to 30 mol % of the dicarboxylic acid units are constituent units derived from isophthalic acid. The polyamide resin is preferably a polyamide resin in which 80 mol % or more of the diamine units are constituent units derived from xylylene diamine (preferably meta-xylylene diamine), from 80 to 99 mol % of the dicarboxylic acid units are constituent units derived from adipic acid, and from 1 to 20 mol % of the dicarboxylic acid units are constituent units derived from isophthalic acid.

Adding an isophthalic acid unit as a dicarboxylic acid unit reduces the melting point, and as a result, the molding processing temperature can be lowered, and therefore thermal deterioration during molding can be suppressed, and stretching moldability is improved by delaying the crystallization time.

Furthermore, besides the above-mentioned diamines and dicarboxylic acids, lactams such as ε-caprolactam and laurolactam; aliphatic aminocarboxylic acids such as aminocaproic acid and aminoundecanoic acid; and aromatic aminocarboxylic acids such as p-aminomethylbenzoic acid can also be used as components constituting the xylylene group-containing polyamide resin, within a range that does not impair the effect of the present invention.

The xylylene group-containing polyamide resin is preferably produced by a polycondensation reaction (hereinafter, also referred to as "melt polycondensation") in a molten state. For example, the xylylene group-containing polyamide resin is preferably produced by a method in which a nylon salt composed of a diamine and a dicarboxylic acid is subjected to a temperature increase using a pressurization method in the presence of water, and is polymerized in a molten state while removing the water. In addition, the xylylene group-containing polyamide resin may also be produced by a method in which the diamine is added directly to molten dicarboxylic acid, and the contents are polycondensed under atmospheric pressure. In this case, in order to maintain the reaction system in a uniform liquid state, preferably, the diamine is continuously added to the dicarboxylic acid, and during that time, polycondensation is allowed to proceed while increasing the temperature of the reaction system such that the reaction temperature does not fall below the melting points of the produced oligoamide and polyamide. Furthermore, the molecular weight of the xylylene group-containing polyamide can also be increased by further subjecting the product formed through melt polycondensation to solid phase polymerization as necessary.

The xylylene group-containing polyamide resin is preferably subjected to polycondensation in the presence of a phosphorus atom-containing compound. When the xylylene group-containing polyamide resin is subjected to polycondensation in the presence of a phosphorus atom-containing compound, the processing stability during melt molding is enhanced, and coloration is readily suppressed.

The phosphorous atom-containing compound is preferably a hypophosphorous acid compound or a phosphorous acid compound, and is more preferably a hypophosphorous acid compound.

The phosphorus atom-containing compound is preferably an organic metal salt, and of these, alkali metal salts are more preferable.

From the perspective of promoting a polymerization reaction and the perspective of preventing coloration, examples of the hypophosphorous acid compound include hypophosphorous acid, metal hypophosphites, metal phenyl phosphonites, ethyl hypophosphite, dimethyl phosphinic acid, phenyl methyl phosphinic acid, phenyl phosphonous acid, and ethyl phenyl phosphonite, and metal hypophosphites are preferable.

Examples of the metal hypophosphites include sodium hypophosphite, potassium hypophosphite, lithium hypophosphite, and calcium hypophosphite, and sodium hypophosphite is more preferable.

Examples of the metal phenyl phosphonites include sodium phenyl phosphonite, potassium phenyl phosphonite, and lithium phenyl phosphonite.

Examples of the phosphorous acid compound include phosphorous acid, pyrophosphorous acid, metal phosphites, metal ethyl phosphonates, metal phenyl phosphonates, triethyl phosphite, triphenyl phosphite, ethyl phosphonic acid, phenyl phosphonic acid, and diethyl phenyl phosphonate.

Examples of metal phosphites include sodium hydrogen phosphite, sodium phosphite, potassium phosphite, and calcium phosphite.

Examples of the metal ethyl phosphonates include sodium ethyl phosphonate and potassium ethyl phosphonate, and examples of the metal phenyl phosphonates include sodium phenyl phosphonate, potassium phenyl phosphonate, and lithium phenyl phosphonate.

The phosphorus atom-containing compound may be one type, or two or more types may be used in combination.

Furthermore, polycondensation of the xylylene group-containing polyamide resin is preferably carried out in the presence of a phosphorus atom-containing compound and an alkali metal compound. When the usage amount of phosphorus atom-containing compound is large, there is a concern that the polyamide resin may form a gel. Therefore, from the viewpoint of adjusting the rate of the amidation reaction, an alkali metal compound preferably coexists with the phosphorus atom-containing compound.

Examples of the alkali metal compound include alkali metal hydroxides and alkali metal acetates. Examples of the alkali metal hydroxide include lithium hydroxide, sodium hydroxide, potassium hydroxide, rubidium hydroxide, and cesium hydroxide, and examples of the alkali metal acetate include lithium acetate, sodium acetate, potassium acetate, rubidium acetate, and cesium acetate.

When an alkali metal compound is used in polycondensation of the polyamide resin, from the viewpoint of suppressing the formation of a gel, the usage amount of the alkali metal compound is in a range in which a value calculated by dividing the number of moles of the alkali metal compound by the number of moles of the phosphorus atom-containing compound is preferably from 0.5 to 1, more preferably from 0.55 to 0.95, and even more preferably from 0.6 to 0.9.

The number average molecular weight of the polyamide resin is selected, as appropriate, according to the application and molding method of the multilayer hollow container, but from the perspectives of moldability and strength of the multilayer hollow container, the number average molecular weight is preferably from 10000 to 60000, and more preferably from 11000 to 50000.

Note that the number average molecular weight of the polyamide resin is calculated from the following equation (X).

$$\text{Number average molecular weight} = 2\times 1000000/([\text{COOH}]+[\text{NH}_2]) \ldots \quad (X)$$

(Where [COOH] represents the terminal carboxyl group concentration (μmol/g) in the polyamide resin, and [NH2] represents the terminal amino group concentration (μmol/g) in the polyamide resin.) Here, the terminal carboxyl group concentration is a value that is calculated by neutralization titration of a solution of the polyamide in benzyl alcohol with an aqueous sodium hydroxide solution.

From the viewpoint of suppressing yellowing of the recycled polyester, the terminal amino group concentration of the polyamide resin (Y) in the present invention is preferably not greater than 50 μmol/g, more preferably not greater than 45 μmol/g, even more preferably not greater than 40 μmol/g, yet even more preferably not greater than 30 μmol/g, and particularly preferably not greater than 20 μmol/g.

The terminal amino group concentration in the polyamide resin (Y) is determined by precisely weighing the polyamide resin, dissolving the polyamide resin in a phenol/ethanol (4/1 by volume) solution under stirring at 20 to 30° C. until the polyamide resin is completely dissolved, and then rinsing the inner wall of the container with 5 mL of methanol under stirring, followed by neutralization titration with a 0.01 mol/L hydrochloric acid aqueous solution.

The method for adjusting the terminal amino group concentration of the polyamide resin (Y) is not particularly limited, but the terminal amino group concentration can be suppressed to a low level through, for example, a method in which the charged ratio (molar ratio) of the diamine and the dicarboxylic acid is adjusted, and a polycondensation reaction is carried out; a method in which a monocarboxylic acid capable of capping an amino group is charged together with the diamine and the dicarboxylic acid, and a polycondensation reaction is carried out; or a method in which the polycondensation reaction is carried out, after which the resultant is reacted with a carboxylic acid capable of capping an amino group.

The content of the polyamide resin (Y) contained in the polyamide layer is preferably from 0.05 to 7.0 mass % relative to the total amount of all polyamide layers and all polyester layers, and from the perspectives of resistance to a reactive liquid and suppressing yellowing of the recycled polyester, the content thereof is more preferably from 0.5 to 6.0 mass %, even more preferably from 1.0 to 5.0 mass %, and yet even more preferably from 1.5 to 4.5 mass %.

Note that in the present invention, the "total amount of all polyamide layers and all polyester layers" is the total mass of all polyamide layers and all polyester layers configuring the multilayer hollow container, and when a plurality of layers of each are present, it is the total amount of all of these layers.

(Yellowing Inhibitor (A))

The polyamide layer of the multilayer hollow container contains a yellowing inhibitor (A).

The content of the yellowing inhibitor (A) is preferably from 1 to 30 ppm relative to the total amount of all polyamide layers and all polyester layers, and from the perspective of effectively suppressing yellowing of the recycled polyester, the content thereof is more preferably from 1.5 to 25 ppm, and from the perspective of mixability and moldability during manufacturing, the content thereof is even more preferably from 2 to 22 ppm, and yet even more preferably from 3 to 20 ppm.

Note that "ppm" in the present invention indicates parts per million by mass.

From the perspective of effectively suppressing yellowing of the recycled polyester, the content of the yellowing inhibitor (A) in the polyamide layer is preferably from 0.001 to 1.0 mass %, more preferably from 0.005 to 0.5 mass %, even more preferably from 0.008 to 0.1 mass %, and yet even more preferably from 0.01 to 0.08 mass %.

The yellowing inhibitor (A) is preferably at least one selected from the group consisting of dyes and pigments, and is more preferably a dye from the perspective of transparency.

Blue dyes and blue pigments are preferred as the dyes and pigments.

Yellowing of the recycled polyester produced from the multilayer hollow container of the present invention can be suppressed by using an extremely small amount of a dye or pigment. Further, a recycled polyester having excellent transparency can be produced using an even smaller amount of a dye.

Examples of the dye include anthraquinone-based dyes, pyrazolone-based dyes, coumarin-based dyes, perinone-based dyes, methine-based dyes, and quinophthalone-based dyes, and anthraquinone-based dyes are preferable.

Examples of the anthraquinone-based dyes include anthraquinone-based dyes in which a hydrogen atom of the aromatic ring is substituted with an aromatic amine, an aliphatic amine, a hydroxyl group, or a halogen, and an anthraquinone-based dye in which a hydrogen atom of the aromatic ring is substituted with an aromatic amine is preferable.

Yellowing of the recycled polyester produced from the multilayer hollow container of the present invention can be suppressed by using an extremely small amount of an anthraquinone-based dye.

The anthraquinone-based dye is more preferably an anthraquinone-based blue dye.

The anthraquinone-based dye is preferably a compound represented by Formula (1) below.

(1)

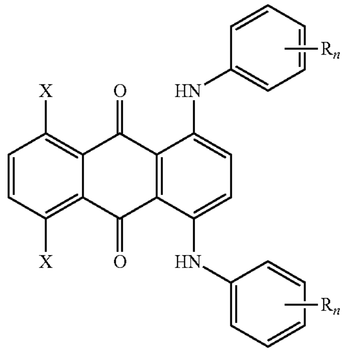

(Where n represents the number of R, and the two n are each independently from 1 to 5. Each R independently represents a $C_{1-4}$ alkyl group. The two X each independently represent a hydrogen atom or a hydroxyl group.)

In Formula (1), n is from 1 to 5, preferably from 2 to 5, and more preferably from 2 to 3. Yellowing ($\Delta b^*$ value) of the recycled polyester can be suppressed by setting n to the range described above. Each R is independently a $C_{1-4}$ alkyl group, and is preferably at least one selected from the group consisting of a methyl group and an ethyl group. The R is preferably substituted at least at the para position or ortho position relative to the amino group, is more preferably substituted at least at the ortho position, and is even more preferably substituted at the para position and the ortho position. The two X are each independently a hydrogen atom or a hydroxyl group, and a hydrogen atom is preferable.

Specific examples of the compounds represented by Formula (1) include 1,4-bis[(2-ethyl-6-methylphenyl)amino] anthraquinone, Solvent Blue 97, Solvent Blue 104, Solvent Green 3, and Solvent Green 28, and 1,4-bis[(2-ethyl-6-methylphenyl)amino] anthraquinone, Solvent Blue 97, and Solvent Blue 104 are preferable.

Relative to the total amount of all polyamide layers and all polyester layers, the content of the dye is preferably from 1 to 30 ppm and more preferably from 1.5 to 25 ppm from the perspective of effectively suppressing yellowing of the recycled polyester, and furthermore, from the perspective of mixability and moldability during manufacturing, the content thereof is more preferably from 3 to 22 ppm, even more preferably from 8 to 20 ppm, yet even more preferably from 4 to 15 ppm, and still even more preferably from 5 to 10 ppm.

Note that "ppm" in the present invention indicates parts per million by mass.

From the perspective of effectively suppressing yellowing of the recycled polyester, the content of the dye in the polyamide layer is preferably from 0.001 to 1.0 mass %, more preferably from 0.005 to 0.5 mass %, even more preferably from 0.008 to 0.1 mass %, and yet even more preferably from 0.01 to 0.06 mass %.

Examples of pigments include phthalocyanine compounds (phthalocyanine pigments).

Examples of phthalocyanine compounds include metal-free phthalocyanines and copper phthalocyanines, and copper phthalocyanines are preferable.

Examples of copper phthalocyanines include a-type copper phthalocyanine (Pigment Blue 15:1), β-type copper phthalocyanine (Pigment Blue 15:3 or 15:4), ε-type copper phthalocyanine (Pigment Blue 15:6), chlorinated copper phthalocyanine, and brominated copper phthalocyanine, and a-type copper phthalocyanine and β-type copper phthalocyanine are preferable.

Relative to the total amount of all polyamide layers and all polyester layers, the content of the pigment is preferably from 1 to 30 ppm and more preferably from 1.5 to 25 ppm from the perspective of effectively suppressing yellowing of the recycled polyester, and furthermore, from the perspective of mixability and moldability during manufacturing, the content thereof is more preferably from 3 to 22 ppm, and even more preferably from 8 to 20 ppm.

Note that "ppm" in the present invention indicates parts per million by mass.

From the perspective of effectively suppressing yellowing of the recycled polyester, the content of the pigment in the polyamide layer is preferably from 0.001 to 1.0 mass %, more preferably from 0.005 to 0.5 mass %, even more preferably from 0.01 to 0.1 mass %, and yet even more preferably from 0.03 to 0.08 mass %.

One type of the yellowing inhibitor (A) may be used alone, or two or more types may be used in combination.

Commercially available products of the yellowing inhibitor (A) include MACROLEX Blue RR Gran (anthraquinone-based dye, available from Lanxess AG), MACROLEX Blue 3R (1,4-bis [(2-ethyl-6-methylphenyl)amino]anthraquinone, anthraquinone-based dye, available from Lanxess AG), Oracet Blue 690 (anthraquinone-based dye, available from BASF SE), HELIOGEN BLUE K6907 (Pigment Blue 15:1, a-type copper phthalocyanine pigment, available from BASF SE), and HELIOGEN BLUE K7090 (Pigment Blue 15:3, β-type copper phthalocyanine pigment, available from BASF SE).

(Greening Inhibitor (B))

The polyamide layer of the multilayer hollow container preferably includes a greening inhibitor (B).

The greening inhibitor (B) suppresses green color in a −a* direction as measured with a color difference meter when the multilayer hollow container of the present invention is recycled to produce a recycled polyester.

The content of the greening inhibitor (B) is preferably from 1 to 30 ppm relative to the total amount of all polyamide layers and all polyester layers, and from the perspective of effectively suppressing greening of the recycled polyester, the content thereof is more preferably from 1.5 to 25 ppm, and from the perspective of mixability and moldability during manufacturing, the content thereof is even more preferably from 2 to 22 ppm, and yet even more preferably from 3 to 20 ppm.

Note that “ppm” in the present invention indicates parts per million by mass.

From the perspective of effectively suppressing greening of the recycled polyester, the content of the greening inhibitor (B) in the polyamide layer is preferably from 0.001 to 1.0 mass %, more preferably from 0.005 to 0.5 mass %, even more preferably from 0.008 to 0.1 mass %, and yet even more preferably from 0.01 to 0.08 mass %.

The greening inhibitor (B) is preferably at least one selected from the group consisting of dyes and pigments, and is more preferably a dye from the perspective of transparency.

Among the dyes, the red colorant (B) is preferably at least one selected from the group consisting of anthraquinone-based dyes and azo-based dyes, and from the perspective of thermal resistance, an anthraquinone-based dye is more preferable.

Furthermore, the greening inhibitor (B) is preferably a red dye, is more preferably at least one selected from the group consisting of anthraquinone-based red dyes and azo-based red dyes, and from the perspective of thermal resistance, is even more preferably an anthraquinone-based red dye.

Greening of recycled polyester produced from the multilayer hollow container of the present invention can be suppressed by using extremely small amounts of an anthraquinone-based red dye and an azo-based red dye.

The anthraquinone-based dye is preferably a compound represented by Formula (2) below.

(2)

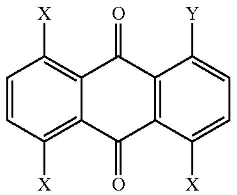

(2a)

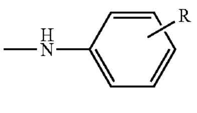

(In Formula (2), the two Y are each independently a hydrogen atom or a group represented by Formula (2a), and the two X are each independently a hydrogen atom or a hydroxyl group. However, at least one Y is a group represented by Formula (2a).

Furthermore, in Formula (2a), R represents a $C_{1-4}$ alkyl group.)

In Formula (2), each of the two Y independently represents a hydrogen atom or a group represented by Formula (2a), but at least one Y is a group represented by Formula (2a). Preferably, one Y is a group represented by Formula (2a), and the other Y is a hydrogen atom.

The two X each independently represent a hydrogen atom or a hydroxyl group, but when one Y is a group represented by Formula (2a), the X bonding to the same aromatic ring is preferably a hydroxyl group.

In Formula (2a), R represents a $C_{1-4}$ alkyl group and is preferably at least one selected from the group consisting of a methyl group and an ethyl group. Note that when the two Y are both groups represented by Formula (2a), the two R in the groups represented by Formula (2a) may be the same or different. R is preferably substituted at the para position with respect to the amino group.

Specific examples of the compound represented by Formula (2) include Solvent Violet 36 and Solvent Violet 13, and Solvent Violet 36 is preferable.

One type of the greening inhibitor (B) may be used alone, or two or more types may be used in combination.

Examples of commercially available products of the greening inhibitor (B) include MACROLEX Violet 3R Gran (anthraquinone-based dye, available from Lanxess AG), MACROLEX Violet B Gran (anthraquinone-based dye, available from Lanxess AG), MACROLEX Red Violet R Gran (Disperse Violet 31, Disperse Violet 26, Solvent Violet 59, anthraquinone-based dye, available from Lanxess AG), MACROLEX RED 5B Gran (Disperse Violet 31, Disperse Violet 26, Solvent Violet 59, anthraquinone-based dye, available from Lanxess AG), and MACROLEX Red B (Solvent Red 195, azo-based dye, available from Lanxess AG).

A mass ratio [(A)/(B)] of the yellowing inhibitor (A) and the greening inhibitor (B) in the polyamide layer of the multilayer hollow container of the present invention is preferably from 20/80 to 80/20, more preferably from 30/70 to 70/30, and even more preferably from 40/60 to 60/40.

When the mass ratio is within this range, the hue change of the recycled polyester produced after being recycled is small, and in particular, a polyester having excellent achromaticity is produced.

(Other Components)

The polyamide layer may contain other components. Examples of the other components include thermal stabilizers, photostabilizers, moisture-proof agents, waterproofing agents, lubricants, and spreading agents.

The polyamide layer may contain, within a range that does not impair the effects of the present invention, a resin other than the polyamide resin (Y) that is the main component.

In particular, when the yellowing inhibitor (A) is mixed using the masterbatch method described below, it is preferable to contain the polyamide resin or polyester resin used in the masterbatch. In this case, the content of the polyamide resin or polyester resin used in the masterbatch is preferably from 1 to 20 mass % and more preferably from 3 to 15 mass % relative to the amount of resin in the entire polyamide layer.

(Resin Composition in Polyamide Layer)

From the perspective of gas barrier properties, the content of the polyamide resin (Y) in the polyamide layer is preferably from 80 to 100 mass %, and more preferably from 90 to 100 mass % relative to the amount of resin in the entire polyamide layer.

<Structure and Characteristics of Multilayer Hollow Container>

A multilayer hollow container of the present invention has a multilayer structure including a polyester layer containing a polyester resin (X), and a polyamide layer containing a polyamide resin (Y) and a yellowing inhibitor (A), and the polyamide layer is an intermediate layer and is present from a ground contact portion to a position of from 10 to 70% of a height of the multilayer hollow container.

A resin layer other than the polyester layer and the polyamide layer may be included in the multilayer hollow container of the present invention, but from the perspectives of facilitating separation during recycling and improving the yellowing suppression effect, the content of the resin layer other than the polyester layer and the polyamide layer is preferably low, and more preferably, the multilayer hollow container of the present invention is substantially free of a resin layer other than the polyester layer and the polyamide layer. Additionally, an adhesive layer made from an adhesive or an inorganic layer made from an inorganic material may be provided, but from the perspectives of facilitating separation during recycling and improving the yellowing suppression effect, the content of the adhesive layer or the inorganic layer is preferably low, and more preferably, the multilayer hollow container of the present invention is substantially free of an adhesive layer or an inorganic layer.

The multilayer hollow container of the present invention has a multilayer structure of three or more layers in which a polyamide layer is at least one layer of the intermediate layer, preferably has a structure of from three to five layers, more preferably has a three layer structure or a five layer structure, and even more preferably has a three layer structure.

At least one layer of the intermediate layer of the multilayer hollow container of the present invention is a polyamide layer, but the outermost layer is preferably a polyester layer. Furthermore, the innermost layer is also preferably a polyester layer, and more preferably the outermost layer and the innermost layer are both polyester layers.

Here, the “outermost layer” is a layer that is present on the outer surface of the multilayer hollow container and is usually in contact with the atmosphere (air), the “innermost layer” is a layer that is present on the inner surface of the multilayer hollow container and is in contact with the contents, and the “intermediate layer” is a layer other than the outermost layer and innermost layer.

When the outermost layer is a polyester layer, the multilayer hollow container excels in impact resistance, appearance and design properties.

Therefore, as the structure of the multilayer hollow container, the multilayer hollow container more preferably has a structure of from three to five layers with the outermost layer and the innermost layer being polyester layers.

In the case of a three-layer structure, the structure is preferably, in order from the innermost layer, a polyester layer/polyamide layer/polyester layer, and in the case of a five-layer structure, the structure is preferably, in order from the innermost layer, a polyester layer/polyamide layer/polyester layer/polyamide layer/polyester layer.

In the multilayer hollow container of the present invention, the polyamide layer is an intermediate layer, and the polyamide layer is present from the ground contact portion to a position of 10 to 70% of the container height.

“The polyamide layer is present from the ground contact portion to a position of 10 to 70% of the container height” means that in a case of the narrowest range in which the polyamide layer is present, the polyamide layer is present from the ground contact portion (position at 0% of the container height) to a position of 10% of the container height. Furthermore, in a case of the widest range in which the polyamide layer is present, the polyamide layer is present from the ground contact portion (position at 0% of the container height) to a position of 70% of the container height. That is, in the multilayer hollow container of the present invention, the polyamide layer is an intermediate layer, and the polyamide layer is present in a range from the ground contact portion (position at 0% of the container height) to a position of at least 10% of the container height, with the upper limit being a position of 70% of the container height.

From the viewpoints of achieving both resistance to a reactive liquid such as a bleaching agent and delamination resistance, and further suppressing yellowing of the recycled polyester, the polyamide layer is present from the ground contact portion to a position of from 10 to 70% of the container height, is preferably present from the ground contact portion to a position of from 10 to 60% of the container height, is more preferably present from the ground contact portion to a position of from 10 to 50% of the container height, is even more preferably present from the ground contact portion to a position of 10 to 40% of the container height, and is yet even more preferably present from the ground contact portion to a position of 10 to 30% of the container height.

Figure 2:
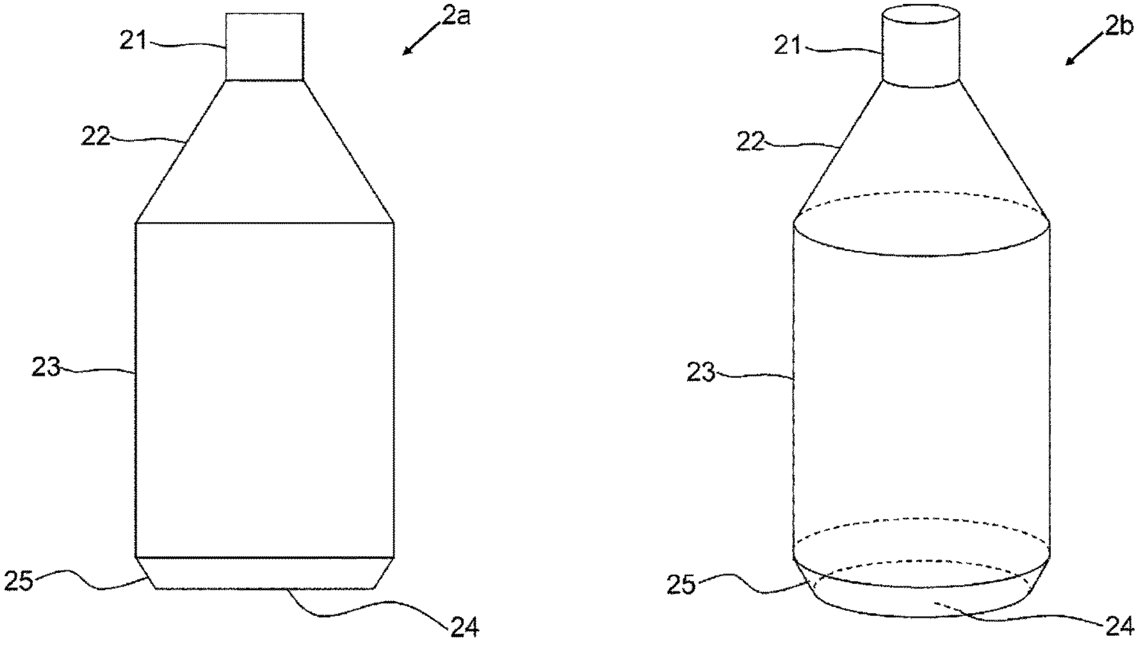
FIG. 2 is a side view and a perspective view illustrating an embodiment of a multilayer container (in which the bottom surface is convex) of the present invention.

FIGS. 1 and 2 each illustrate an embodiment of a multilayer container of the present invention. FIG. 1 illustrates a multilayer container having a concave bottom (FIG. 1*a* is a side view and FIG. 1*b* is a perspective view), and FIG. 2 illustrates a multilayer container having a convex bottom (FIG. 2*a* is a side view and FIG. 2*b* is a perspective view). Each portion of the present invention will be described with reference to these drawings.

The “ground contact portion” is a portion that comes into contact with a horizontal surface when the multilayer hollow container of the present invention is placed on a horizontal surface. In the container of FIG. 1, the ground contact portion is a lower end (14) of a trunk section, and in the container of FIG. 2, the ground contact portion is a surface (24) that contacts the horizontal surface.

The “container height” is the length of the longest perpendicular line in contact with the container when a perpendicular line is drawn in relation to the horizontal surface on which the multilayer hollow container is placed, that is, the distance from the ground contact portion to an upper end part of the multilayer hollow container. In the container of FIG. 1, the container height is the shortest distance from the lower end (14) of the trunk section to the upper end of a neck section (11), and in the container of FIG. 2, the container height is the shortest distance from the surface (24) in contact with the horizontal surface to the upper end of a neck section (21).

Further, the “trunk section” is a portion configuring a side surface of the container and serving as a main portion of the container, and is a portion excluding the neck section and the bottom surface. In the container of FIG. 1, the trunk section is the entirety of a truncated cone portion (12) and a cylindrical portion (13), and in the container of FIG. 2, the trunk section is the entirety of a truncated cone portion (22) and a cylindrical portion (23).

The “bottom surface” is the portion that contacts the horizontal surface when the container is placed on the horizontal surface, and in addition, is the portion that holds the contents in the direction of gravity when the multilayer container is filled with the contents. Normally, when the container is viewed from directly above, the bottom surface is present in the lower part of the container and has the same shape as the shape of the container. In the container of FIG. 1, the bottom surface is a generally concave hemisphere (15), and in the container of FIG. 2, the bottom surface is a combination of an inverted truncated cone portion (25) and the surface (24) in contact with the horizontal surface.

The "neck section" is a portion that does not substantially contribute to holding of the contents, and is a portion provided with an opening for filling or discharging the contents. The neck section is usually provided at the top of the container, and is provided with a fitting part for fitting together with a lid. In the container of FIG. 1, the neck section is a cylindrical portion (11), and in the container of FIG. 2, the neck section is a cylindrical portion (21).

It should be noted that a decorative portion, a handle part, and the like that do not affect storage of the contents are not included in the "ground contact portion", the "container height", the "trunk section", or the "bottom surface". The "neck section" does not include a decorative portion or the like. In addition, the "ground contact portion", the "container height", the "trunk section", the "bottom surface", and the "neck section" do not include a lid, skirting, or the like molded separately from the multilayer hollow container and fixed to the multilayer hollow container.

When the polyamide layer is present at the above-described position, both delamination resistance and resistance to a reactive liquid such as a bleaching agent can be achieved. The reason for this is not clear but is assumed to be as follows. In the multilayer container, it is conceivable that resistance to a reactive liquid such as a bleaching agent serving as the content of the container, and particularly cracking resistance can be enhanced by concentrating the polyamide layer in the intermediate layer in the vicinity of the bottom surface and in the vicinity of the lower portion of the trunk section, which are likely to have a complex shape and a low draw ratio and are in contact with the contents for a long time. Further, it is conceivable that delamination (peeling) of the entire container is unlikely to occur because the upper portion is formed of a polyester layer.

From the viewpoints of achieving resistance to a reactive liquid such as a bleaching agent while also achieving particularly cracking resistance and delamination resistance, and further suppressing yellowing of the recycled polyester, the polyamide layer is preferably substantially present continuously at least from the ground contact portion to a position of 10% of the container height, and is more preferably present continuously at least from the ground contact portion to a position of 10% of the container height.

Moreover, from the viewpoints of achieving resistance to a reactive liquid such as a bleaching agent while also achieving particularly cracking resistance and delamination resistance, and further suppressing yellowing of the recycled polyester, the polyamide layer is preferably present on 90% or more of the bottom surface, is more preferably present on 99% or more of the bottom surface, and is preferably present on 100% or less of the bottom surface. The polyamide layer is more preferably present on 100% of the bottom surface, and is even more preferably present on the entire bottom surface.

In particular, from the viewpoints of further enhancing resistance to a reactive liquid such as a bleaching agent, delamination resistance, and the suppression of yellowing of the recycled polyester, the polyamide layer is preferably present on the entire bottom surface and substantially continuously present at least from the ground contact portion to a position of 10% of the container height, and is more preferably present on the entire bottom surface and continuously present at least from the ground contact portion to the position of 10% of the container height.

The matter of the polyamide layer being "continuously present from the ground contact portion to the position of 10% of the container height" means that the polyamide layer is present over the entire surface from the ground contact portion to the position of 10% of the container height, and means that the polyamide layer is always present at any position from the ground contact portion to the position of 10% of the container height and when viewed perpendicularly to the outer surface from the outer surface to the inner surface of the container.

The polyamide layer may be substantially present continuously from the ground contact portion to a position of 10 to 70% of the container height, may be substantially present continuously from the ground contact portion to a position of 10 to 60% of the container height, may be substantially present continuously from the ground contact portion to a position of 10 to 50% of the container height, may be substantially present continuously from the ground contact portion to a position of 10 to 40% of the container height, or may be substantially present continuously from the ground contact portion to a position of 10 to 30% of the container height.

"Present on 90% or more of the bottom surface" means that the polyamide layer is present on 90% or more of the area of the bottom surface, and "present on the entire bottom surface" means that the polyamide layer is always present at any position when viewed perpendicularly from the outer surface to the inner surface of the bottom surface.

A ratio (thickness ratio W/S) of a thickness (W) of the polyester layer to a thickness (S) of the polyamide layer in a portion at which the polyamide layer is the intermediate layer in the multilayer hollow container of the present invention is preferably from 2.5 to 200. Note that the thickness of the polyester layer refers to the average thickness, and when a plurality of polyester layers is present in the trunk section, the total thickness of the thicknesses of the plurality of layers is determined. The same applies to the thickness of the polyamide layer.

The thickness ratio W/S is preferably 2.5 or greater because at such ratio, the polyamide resin is easily separated from the polyester resin in a separation step of a method for manufacturing recycled polyester, and particularly in air elutriation or specific gravity separation. When the thickness ratio W/S is 200 or less, the gas barrier properties of the hollow container are excellent, and the contents can be stored for a long period of time.

From the perspective of improving the properties of the multilayer hollow container of delamination resistance and resistance to a reactive liquid such as a bleaching agent while increasing separation ease in the separation step, the thickness ratio (W/S) is more preferably from 3 to 50, and even more preferably from 4 to 15.

Additionally, the thickness of the trunk section (total thickness of all layers of the trunk section) of the multilayer hollow container is preferably from 100 μm to 5 mm, more preferably from 150 μm to 3 mm, and even more preferably from 200 μm to 2 mm. Additionally, the thickness (W) of each polyester layer is preferably from 30 μm to 2 mm, more preferably from 40 μm to 1 mm, and even more preferably from 50 μm to 500 μm.

The thickness (S) of the polyamide layer is, per layer, preferably from 1 to 200 μm, more preferably from 3 to 100 μm, and even more preferably from 8 to 50 μm. In the present invention, when the thickness of the polyamide layer is within this range, the polyamide layer is easily separated from the polyester in a separation step while ensuring delamination resistance and resistance to a reactive liquid such as a bleaching agent.

[Bleaching Agent Article]

A bleaching agent article of the present invention is a bleaching agent article in which a chlorine-based liquid bleaching agent composition is contained in a multilayer hollow container of the present invention.

That is, the bleaching agent article accommodates a chlorine-based liquid bleaching agent in a multilayer hollow container having a polyester layer containing a polyester resin (X), and a polyamide layer containing a polyamide resin (Y) and a yellowing inhibitor (A) with the polyamide layer being an intermediate layer and being present from a ground contact portion to a position of from 10 to 70% of the height of the multilayer hollow container. When a chlorine-based liquid bleaching agent composition is accommodated and stored in the multilayer hollow container of the present invention, a bleaching agent article having cracking resistance can be produced by employing a structure in which a polyamide layer is intensively disposed as an intermediate layer where cracks are likely to occur, namely, in a lower part of the trunk section and in the bottom surface of the multilayer container.

The multilayer hollow container of the present invention exhibits delamination resistance and resistance to a reactive liquid such as a bleaching agent, and thus preferably accommodates a chlorine-based liquid bleaching agent composition, and is preferably used in a method for accommodating a chlorine-based liquid bleaching agent composition.

That is, the multilayer hollow container of the present invention may be a multilayer hollow container for a chlorine-based liquid bleaching agent composition, the multilayer hollow container including a polyester layer containing a polyester resin (X), and a polyamide layer containing a polyamide resin (Y) and a yellowing inhibitor (A) with the polyamide layer being an intermediate layer and being present from a ground contact portion to a position of from 10 to 70% of the height of the multilayer hollow container.

Even when the multilayer hollow container of the present invention is used to accommodate a chlorine-based liquid bleaching agent composition, resistance to the bleaching agent is achieved along with particularly cracking resistance and delamination resistance, and yellowing of the recycled polyester when recycled after use can be suppressed, and recycled polyester can be produced without a hue change.

<Chlorine-Based Liquid Bleaching Agent Composition>

The chlorine-based liquid bleaching agent composition contained in the container of the present invention (hereinafter, referred to simply as a "bleaching agent composition") will be described.

(Bleaching Component)

The bleaching agent composition preferably contains, as a bleaching component, chlorite, hypochlorite, chlorinated isocyanurate, or the like, more preferably contains hypochlorite or chlorinated isocyanurate, and even more preferably contains hypochlorite.

The chlorite, hypochlorite, and chlorinated isocyanurate are preferably metal salts, and are more preferably alkali metal salts. As alkali metals, sodium and potassium are preferable, and sodium is more preferable.

Among the bleaching components, sodium hypochlorite is particularly preferable.

When the chlorine-based liquid bleaching agent composition contains sodium hypochlorite, the content of sodium hypochlorite is preferably from 0.5 to 15 mass %, more preferably from 1 to 12 mass %, even more preferably from 2 to 9 mass %, and yet even more preferably from 2 to 8 mass %.

When the content of the sodium hypochlorite is within the above range, excellent bleaching properties and storage stability are achieved.

(Alkaline Agent)

The chlorine-based liquid bleaching agent composition preferably contains an alkaline agent. The alkaline agent is added to achieve a sufficient bleaching effect on stains, as well as to increase the stability of the bleaching components such as sodium hypochlorite in the bleaching agent composition.

Examples of the alkaline agent include alkali metal hydroxides, alkali metal carbonates, silicates, and phosphates, and alkali metal hydroxides are preferable.

The alkali metal is preferably sodium or potassium.

The alkali metal hydroxide is preferably sodium hydroxide, potassium hydroxide, or the like, and of these, sodium hydroxide is preferable.

The concentration of the alkaline agent in the bleaching agent composition is preferably 0.1 mass % or higher, and more preferably 0.2 mass % or higher. Furthermore, the concentration of the alkaline agent is preferably not higher than 5 mass %, more preferably not higher than 3 mass %, even more preferably not higher than 1 mass %, and particularly preferably not higher than 0.8 mass %. When the concentration of the alkaline agent is within the above range, the stability of sodium hypochlorite is favorable, and a sufficient bleaching effect is achieved.

(Chelating Agent)

The bleaching agent composition may contain a chelating agent.

The chelating agent functions to stabilize the bleaching agent composition by trapping heavy metals contained in the bleaching agent composition. Examples of the chelating agent include aminophosphonate-N-oxides, particularly (nitrilotris(methylene))triphosphonate-N-oxide, 2-phosphonobutane-1,2,4-tricarboxylate, 1-hydroxyethane-1,1-diphosphonate, and crosslinked polycarboxylates. A single type of chelating agent may be used alone, or two or more types may be used in combination.

The content of the chelating agent in the bleaching agent composition is preferably from 0.1 to 30 mass %, and more preferably from 0.3 to 20 mass %. If the content of the chelating agent is within this range, sufficient cleaning capability is achieved.

(Surfactant)

The chlorine-based liquid bleaching agent composition preferably contains a surfactant. The inclusion of a surfactant enhances the bleaching performance on articles having various physical surface properties. Examples of the surfactant include anionic surfactants, amphoteric surfactants, non-ionic surfactants, and cationic surfactants, and anionic surfactants and amphoteric surfactants are preferable, and anionic surfactants are more preferable.

Examples of anionic surfactants include sulfuric ester salts, carboxylates, sulfonates, and phosphoric ester salts. Sulfuric ester salts, carboxylates, and sulfonates are preferable, sulfuric ester salts and carboxylates are more preferable, and sulfuric ester salts are even more preferable.

Examples of the sulfuric ester salts include alkyl sulfates and alkyl ether sulfates, and alkyl ether sulfates are preferable.

As specific examples of alkyl ether sulfates, polyoxyalkylene alkyl ether sulfates are preferable, and polyoxyethylene alkyl ether sulfates are more preferable.

The alkyl group of the polyoxyethylene alkyl ether sulfate is preferably a $C_{12-18}$ alkyl group, more preferably a $C_{12-14}$ alkyl group, and even more preferably a $C_{12}$ alkyl group.

The average number of added moles of the ethylene oxy group of the polyoxyethylene alkyl ether sulfate is preferably from 0.5 to 10, and more preferably from 1 to 5.

The polyoxyethylene alkyl ether sulfate is preferably a sodium salt, a potassium salt, or a triethanolamine salt, is more preferably a sodium salt or a triethanolamine salt, and is even more preferably a sodium salt.

Specifically, sodium polyoxyethylene lauryl ether sulfate is preferable.

Examples of the carboxylate include fatty acid salts and α-sulfo fatty acid ester salts.

Examples of the sulfonate include alkyl benzene sulfonates, α-olefin sulfonates, and alkyl sulfonates.

Examples of the phosphoric ester salts include alkyl phosphates.

Examples of amphoteric surfactants include alkylamine oxides, alkyl betaines, and alkylamino fatty acid salts, and alkylamine oxides are preferable.

Examples of non-ionic surfactants include sucrose fatty acid esters sorbitan fatty acid esters, polyoxyethylene sorbitan fatty acid esters, fatty acid alkanolamides, polyoxyethylene alkyl ethers, and polyoxyethylene alkylphenyl ethers.

Examples of cationic surfactants include alkyl trimethylammonium salts and dialkyl dimethylammonium salts. Cationic surfactants are used primarily to impart sanitation properties.

Among these, polyoxyalkylene alkyl ether sulfates and alkylamine oxides are preferable.

One type of surfactant may be used alone, or two or more types may be used in combination. The content of the surfactant in the chlorine-based liquid bleaching agent composition is preferably from 0.01 to 7.0 mass %, more preferably from 0.03 to 5.0 mass %, and even more preferably from 0.05 to 3.0 mass %.

(Other Components, Etc.)

The bleaching agent composition preferably contains a solvent. The content of the solvent in the chlorine-based liquid bleaching agent composition is preferably the balance of the content of the chlorine-based liquid bleaching agent composition after the bleaching component, the surfactant, the alkaline agent, the chelating agent, and the other components described in this section.

Examples of the solvent contained in the bleaching agent composition include water and water-miscible organic solvents, and the solvent is preferably water. The content of water in the chlorine-based liquid bleaching agent composition is preferably from 80 to 98 mass %, more preferably from 88 to 98 mass %, and even more preferably from 90 to 98 mass %. When the water content is within the range described above, the storage stability is excellent.

Examples of the water-miscible organic solvent include alcohols and ethers.

The bleaching agent composition may further contain a fluorescent dye; a radical scavenger such as dibutyl hydroxytoluene (BHT); an abrasive or clouding agent such as calcium carbonate, silica, montmorillonite, or smectite; and a fragrance typified by a terpene alcohol-based fragrance.

The pH of the chlorine-based liquid bleaching agent composition is preferably alkaline, and the pH at 20° C. is preferably from 11 to 13.8, more preferably from 11.3 to 13.7, and even more preferably from 11.5 to 13.5. The pH of the chlorine-based liquid bleaching agent composition is preferably within the range described above from the perspectives of storage stability and the bleaching effect.

[Method for Manufacturing Multilayer Hollow Container]

The present invention provides a method for manufacturing a multilayer hollow container having a polyester layer containing a polyester resin (X), and a polyamide layer containing a polyamide resin (Y) and a yellowing inhibitor (A) with the polyamide layer being an intermediate layer, and the polyamide layer being present from a ground contact portion to a position of from 10 to 70% of a height of the multilayer hollow container, and the manufacturing method includes: a step 1 of mixing the polyamide resin (Y) and the yellowing inhibitor (A) to prepare a polyamide resin mixture; a step 2 of co-injection molding the polyamide resin mixture and a polyester resin composition containing the polyester resin (X) to produce a multilayer preform; and a step 3 of blow molding the multilayer preform.

<Step 1 (Step of Preparing Polyamide Resin Mixture)>

In step 1, the polyamide resin (Y) and the yellowing inhibitor (A) are mixed to prepare a polyamide resin mixture.

Ordinarily, in order to ensure that the yellowing inhibitor spreads throughout the entire container, equipment is required to stir and mix or knead the yellowing inhibitor and all of the resins. However, in the manufacturing method of the multilayer hollow container of the present invention, the yellowing inhibitor (A) is mixed into a small amount of the polyamide resin (Y), and thereby the yellowing inhibitor (A) can be efficiently spread throughout the entire container by mixing on a small scale for a short period of time, and thus the manufacturing method of the present invention excels in productivity.

The method of mixing may be dry blending or melt blending (melt kneading), but from the perspectives of reducing the heat history and preventing degradation of the resin or yellowing inhibitor, dry blending and melt blending with the masterbatch method are preferable. Further, from the perspective of preventing the yellowing inhibitor from adhering to and remaining on a molding machine or around the molding machine in step 2, melt blending is preferable, and of the melt blending techniques, the masterbatch method is preferable from the perspective of reducing the heat history and preventing degradation of the resin and yellowing inhibitor.

In step 1, the pellet-shaped polyamide resin (Y) and the yellowing inhibitor (A) are preferably mixed at a temperature of 230° C. or lower, are more preferably mixed at a temperature of 150° C. or lower, and are even more preferably mixed at a temperature of 100° C. or lower. When mixing is implemented at a temperature of 230° C. or lower, the heat history can be reduced, and degradation of the resin or yellowing inhibitor can be prevented. It is conceivable that this is achieved because the polyamide resin can maintain the pellet shape, and therefore thermal degradation is minimal. Dry blending is preferably implemented when mixing at a temperature of 230° C. or lower.

The yellowing inhibitor (A) suitably used in step 1 is the same as the yellowing inhibitor (A) described in the Yellowing inhibitor (A) section above, and is preferably at least one selected from the group consisting of dyes and pigments, and is more preferably an anthraquinone-based dye.

Furthermore, the yellowing inhibitor (A) is preferably in the form of a powder, a dispersion, or a solution, and is more preferably in the form of a powder. The yellowing inhibitor (A) in these forms can be more easily and uniformly mixed with the polyamide resin (Y).

By mixing the pellet-shaped polyamide resin (Y) and the powdered yellowing inhibitor (A) at a low temperature in this manner, the yellowing inhibitor can be uniformly mixed with the resin while preventing degradation of the resin or yellowing inhibitor.

In addition, the greening inhibitor (B) is preferably further mixed in step 1.

The greening inhibitor (B) suitably used in step 1 is the same as the greening inhibitor described in the above Greening inhibitor (B) section above, and is preferably at least one selected from the group consisting of dyes and pigments, is more preferably at least one selected from the group consisting of anthraquinone-based dyes and azo-based dyes, is even more preferably at least one selected from the group consisting of anthraquinone-based red dyes and azo-based red dyes, and from the perspective of thermal resistance, is yet even more preferably an anthraquinone-based red dye.

Furthermore, the greening inhibitor (B) is preferably in the form of a powder, a dispersion, or a solution, and is more preferably in the form of a powder. The greening inhibitor (B) in these forms can be more easily and uniformly mixed with the polyamide resin (Y).

Examples of the mixing device used in the dry blending include a tumbler mixer, a ribbon mixer, a Henschel mixer, and a Banbury mixer.

Examples of the method for mixing the polyamide resin (Y) and the yellowing inhibitor (A) by melt blending in step 1 include the masterbatch method and a full compounding method, and the masterbatch method is preferable.

The masterbatch method is a method of kneading a small amount of polyamide resin or polyester resin and a yellowing inhibitor (A) to form a masterbatch, and then mixing with the remaining polyamide resin (Y) in step 1. Further, when producing a masterbatch, the greening inhibitor (B) can also be kneaded at the same time. In other words, preferably, in step 1, the polyamide resin or the polyester resin and the yellowing inhibitor (A) are kneaded and then mixed with the polyamide resin (Y), and more preferably, in step 1, the polyamide resin or polyester resin, the yellowing inhibitor (A), and the greening inhibitor (B) are kneaded and then mixed with the polyamide resin (Y).

A polyamide resin or a polyester resin is preferably used in the masterbatch, and from the perspective of miscibility with the polyamide resin (Y), a polyamide resin is preferably used, and from the perspective of suppressing yellowing due to heat history, a polyester resin is preferably used. Note that these materials may be mixed and used.

The polyamide resin used in the masterbatch is preferably a polyamide resin (Y), and is more preferably the same as the remaining polyamide resin (Y).

Also, as the polyester resin used in the masterbatch, a polyester resin that is the same as the polyester resin (X) may be used, or a polyester resin that is the same as the polyester resin (X) of the polyester layer may be used.

The amount of the polyamide resin or the polyester resin used in the masterbatch is preferably from 1 to 20 mass %, and more preferably from 3 to 15 mass % relative to the resin amount of the entire polyamide layer.

When a polyamide resin or a polyester resin and the yellowing inhibitor (A) are kneaded as the method for producing a masterbatch, if the melting point of the resin used in the masterbatch is denoted by Tm, from the perspective of sufficient mixing, the kneading temperature (° C.) is preferably from Tm+5 to Tm+60, more preferably from Tm+10 to Tm+50, and even more preferably from Tm+15 to Tm+40. Specifically, the kneading temperature is even more preferably from 245 to 300° C., yet even more preferably from 250 to 290° C., and still even more preferably from 255 to 280° C. In addition, from the perspective of sufficiently mixing, the kneading time is preferably from 10 to 600 seconds, more preferably from 20 to 400 seconds, and even more preferably from 30 to 300 seconds. Examples of the device used for kneading include an open type mixing roll, and a non-open type device such as a Banbury mixer, a kneader, and a continuous kneader (such as a single-screw kneader, a twin-screw kneader, and a multi-screw kneader).

Furthermore, examples of methods for mixing the masterbatch and the remaining polyamide resin (Y) include dry blending and a kneading method, and dry blending is preferable. For the dry blending, preferably pellets of the masterbatch are mixed with pellets of the remaining polyamide resin (Y) using a mixing device such as a tumbler mixer.

The full compounding method is a method of kneading and mixing the total amount of the polyamide resin (Y) and the yellowing inhibitor (A) used in the polyamide layer.

From the perspective of sufficient mixing, the kneading temperature is preferably from 245 to 300° C., more preferably from 250 to 290° C., and even more preferably from 255 to 280° C. In addition, from the perspective of sufficiently mixing, the kneading time is preferably from 10 to 600 seconds, more preferably from 20 to 400 seconds, and even more preferably from 30 to 300 seconds. Examples of the device used for kneading include an open type mixing roll, and a non-open type device such as a Banbury mixer, a kneader, and a continuous kneader (such as a single-screw kneader, a twin-screw kneader, and a multi-screw kneader).

The polyamide resin mixture produced in this step is preferably a composition similar to that described in the Polyamide layer section above.

<Step 2 (Step of Producing Multilayer Preform)>

In step 2, the polyamide resin mixture and a polyester resin composition containing a polyester resin (X) are co-injection molded to produce a multilayer preform.

The polyester resin composition is preferably a composition similar to that described in the Polyester layer section above, other than the polyester resin (X).

Also, in the co-injection molding, the polyester resin and the polyamide resin mixture are extruded in molds, respectively, and then co-injection molded to form a multilayer preform.

In the multilayer hollow container of the present invention, in the case of co-injection molding, a multilayer hollow container can be produced in which the position of the polyamide layer is concentrated in the bottom surface and at a lower portion of the trunk section by delaying the filling start time of the polyamide resin mixture so as to be later than the filling start time of the polyester resin constituting the polyester layer.

<Step 3 (Blow Molding Step)>

In step 3, the multilayer preform is blow molded.

In the method of manufacturing a multilayer hollow container of the present invention, the multilayer preform (multilayer parison) produced in step 2 is preferably molded by stretch blowing.

Of these, the multilayer preform produced by co-injection molding in step 2 is preferably stretch-blow molded, and more preferably, the multilayer preform produced by co-injection molding is biaxially stretch-blow molded. The conditions for biaxial stretch-blow molding preferably include a preform heating temperature of from 95 to 110° C., a primary blow pressure of from 0.5 to 1.2 MPa, and a secondary blow pressure of from 2.0 to 2.6 MPa. The occurrence of uneven thickness and uneven stretching is suppressed through biaxial stretch-blow molding under these conditions, and therefore a multilayer hollow container having excellent strength can be produced.

[Method for Manufacturing Recycled Polyester]

The multilayer hollow container of the present invention is suitable for recycling as described above, and recycled polyester can be manufactured using the multilayer hollow container of the present invention as a raw material.

The recycled polyester manufacturing method of the present invention preferably includes recovering polyester from the multilayer hollow container.

That is, the method for manufacturing recycled polyester according to the present invention preferably includes a step of recovering polyester from the multilayer hollow container having a polyester layer containing a polyester resin (X) and a polyamide layer containing a polyamide resin (Y) and a yellowing inhibitor (A) with the polyamide layer being an intermediate layer and being present from a ground contact portion to a position of from 10 to 70% of the height of the multilayer hollow container.

The method for manufacturing recycled polyester from the multilayer hollow container preferably includes removing all or a portion of the polyamide layer from the multilayer hollow container, recovering the polyester constituting the polyester layer, and using the recovered polyester as recycled polyester. Note that the method for manufacturing recycled polyester from the multilayer hollow container is not limited to the above-described method, and may be a method of manufacturing recycled polyester without passing through the step of removing the polyamide resin.

The recycled polyester produced by the present manufacturing method can be used in various applications such as resin molded articles and fibers.

Details of the recycled polyester manufacturing method of the present invention will be described below.

In the present manufacturing method, a used multilayer hollow container is ordinarily used, but an unused multilayer hollow container may also be used. Examples of the used multilayer hollow container include those that have been distributed in the market and then collected.

In the present manufacturing method, first, if a lid is attached to the multilayer hollow container, the lid is preferably removed from the multilayer hollow container.

Next, the container is ground, washed as needed, and then subjected to separation to selectively retrieve the polyester as needed, and thereby the polyester is recovered as recycled polyester (recovery step).

Next, if necessary, the polyester is granulated to produce pellets (granulation step).

Further, if necessary, a crystallization step and a solid phase polymerization step are implemented (crystallization/solid phase polymerization step).

Each step is described below.

<Recovery Step>

The recovery step is a step of grinding the multilayer hollow container to recover recycled polyester.

In this step, after the multilayer hollow container is ground, preferably, all or a portion of the polyamide layer is removed, and the polyester is selectively retrieved, and more preferably, the polyester and the polyamide resin constituting the polyamide layer are separated.

The multilayer hollow container can be ground using a grinder such as a single-screw grinder, a twin-screw grinder, a three-screw grinder, or a cutter mill. The ground product produced by grinding is formed into, for example, a flake shape, a powdered shape, or a bulk shape. However, a large portion of the multilayer hollow container, such as the trunk section, is thin with a thickness of several millimeters or less, and therefore most of the ground product is ordinarily flake-shaped. Note that the flake-shaped ground product refers to a flaky or flat shaped product having a thickness of approximately 2 mm or less.

Additionally, in the multilayer hollow container, the polyester layer and the polyamide layer are structurally integrated, but these layers are usually not adhered to each other, and in the grinding step, the polyester and the polyamide resin are easily separated as separate ground products. In addition, by forming the ground product in flake shapes, the ground product is more likely to be blown up and separated by the air flow of the air elutriation described below.

However, the polyester and the polyamide resin are not necessarily materials that can be completely separated in the grinding step, and the ground product is separated into a ground product having a relatively high content percentage of polyester and a ground product having a relatively low content percentage of polyester resin and a relatively high content percentage of polyamide. Note that in the following, for convenience of explanation, the ground product having a relatively high content percentage of polyester is referred to simply as polyester, and the ground product having a relatively high content percentage of polyamide resin is referred to simply as polyamide resin.

As described above, the ground product that has been ground is separated into polyester and polyamide resins (separation step).

As the separation method, specific gravity sorting using the difference in the specific gravities of the polyester and the polyamide resins is preferably used.

In other words, the polyamide layer is preferably removed by air elutriation after the multilayer hollow container is ground.

A specific example of specific gravity sorting is air elutriation in which the ground product is sorted through wind force. An example of air elutriation includes a method in which the ground product is subjected to an airflow generated by a separation device that can internally generate a rotating airflow, and the ground product is separated into: a ground product that has a large specific gravity or a small specific surface area and naturally descends due to the weight of the ground product itself; and a ground product that has a small specific gravity or a large specific surface area and is blown upward by the airflow, and the separated ground products are recovered.

With this method, the ground product of polyester naturally descends under its own weight, whereas the ground product of the polyamide resin is blown upward, and through this, the polyester and polyamide resin can be separated and recovered.

In this type of air elutriation, a similar operation may be repeated for the same ground product. For example, the naturally descended ground product may be once again subjected to air elutriation to increase the content percentage of polyester in the recycled polyester.

Note that the separation method is not limited to air elutriation, and other examples include a method of immersing the ground product in a liquid such as water and separating by differences in specific gravity of the ground product with respect to the liquid, and a method of applying a constant level of vibration to the ground product and separating ground products of different specific gravities.

<Granulation Step>

The recycled polyester that is recovered is preferably granulated and formed into pellets in order to simplify handling during molding and the like.

The granulation may be implemented before or after the below-described crystallization/solid phase polymerization step, but it is preferable to implement granulation before the crystallization/solid phase polymerization step. When granulation is implemented before the crystallization/solid phase polymerization step, handling ease in the crystallization/solid phase polymerization step is favorable.

In the granulation step, it is preferable to plasticize and granulate the ground product through melt blending. Examples of the granulation device for plasticization and granulation include a single-screw extruder, a twin-screw extruder, and a multi-screw extruder, but any known granulation device can be used. The shape of the pellets is preferably cylindrical, spherical, or elliptical.

The granulation preferably includes, for example, extruding the plasticized recycled polyester into a strand, and cutting into pellets using a pelletizer while cooling in a water tank. Pellets removed from the water tank are usually dried to remove moisture adhered to the surface.

<Crystallization/Solid Phase Polymerization Step>

After the above-described step of recovering the polyester, it is preferable to implement one or more steps selected from a crystallization step and a solid phase polymerization step, and it is more preferable to implement both the crystallization step and the solid phase polymerization step. The crystallization/solid phase polymerization step is preferably implemented on the pelletized polyester described above, but may be implemented on a non-pelletized polyester (for example, the ground product).

Note that when crystallization and solid phase polymerization are both implemented, the polyester is preferably crystallized and then subjected to solid phase polymerization.

Crystallization of the polyester is implemented by maintaining the polyester under constant heating. The crystallization is preferably implemented by heating the polyester at a temperature of from 100 to 230° C., for example. The polyester is crystallized, and thereby mutual fusing of the polyester and adhering of the polyester to the inner surface of the device during solid phase polymerization and molding are prevented.

The solid phase polymerization is preferably implemented by maintaining at a temperature of from the (polyester melting point −80° C.) to less than the melting point of the polyester for a certain duration of time. By implementing the solid phase polymerization at a temperature lower than the melting point, melting of the polyester is prevented, and for example, adhering of the polyester to the device surface, which results in a decrease in work efficiency, is prevented. Also, by implementing the solid phase polymerization at a temperature of equal to or higher than the (melting point −80° C.), the polymerization proceeds at a sufficient polymerization rate, and the desired physical properties are easily achieved.

Solid phase polymerization may be carried out under vacuum conditions, and may be carried out under an inert gas stream such as nitrogen or argon. If solid phase polymerization is carried out under vacuum conditions, the vacuum pressure is preferably 1.0 torr or less, more preferably 0.5 torr or less, and even more preferably 0.1 torr or less. Furthermore, under both vacuum conditions and an inert gas stream such as nitrogen or argon, the oxygen concentration remaining in the system is preferably reduced as much as possible, and the oxygen concentration is preferably 300 ppm or less, and more preferably 30 ppm or less. When the oxygen concentration is set to 30 ppm or less, appearance defects such as yellowing are less likely to occur.

Furthermore, when the solid phase polymerization is implemented under vacuum conditions, it is preferable to uniformly maintain heat transfer while constantly repeating the stirring or mixing of the polyester. When the solid phase polymerization is implemented in the presence of an inert gas, it is preferable to keep the surface of the polyester in contact with a dry gas at all times under a stream of the dry gas.

Examples of the solid-phase polymerization device for carrying out the crystallization/solid phase polymerization step include a tumbler-type batch device equipped with a heating jacket, a dry silo-type device provided with inert gas stream equipment, a crystallization device provided internally with a stirrer blade and a discharging screw, and a reactor. Note that the crystallization and solid phase polymerization are preferably implemented consecutively or simultaneously in the same device.

The heating time for the solid phase polymerization is determined in a timely manner based on the device and other conditions, but the time may be any time as long as the polyester achieves sufficient physical properties.

The solid phase polymerization maintains the polyester at a high temperature for a long period of time, and therefore impurities present in the polyester may deteriorate the quality such as the color tone. In the removal step described above, a large portion of the polyamide resin is preferably removed, and in this case, the deterioration of quality that may occur during solid phase polymerization is minimized.

In the recycled polyester manufacturing method of the present invention, steps in addition to the steps described above may be implemented, and a washing step may be implemented to remove contents adhering to the interior of the multilayer hollow container. The washing is preferably implemented by rinsing with a liquid, and may be washing with water, washing with an alkaline aqueous solution, or both.

Furthermore, the washing may be implemented before the multilayer hollow container is ground into a ground product, or may be implemented after grinding, but the washing is preferably implemented before any of granulation, crystallization, and solid phase polymerization are implemented. Furthermore, the washing step may be implemented simultaneously with the grinding step using a grinder called a wet grinder that simultaneously carries out washing and grinding.

In addition, when the washing step is implemented, a drying step may be implemented after the washing step. By implementing the drying step, the amount of moisture in the recycled polyester produced by the present method can be reduced, and therefore high quality recycled polyester can be provided with high thermal stability and the like. The drying step can be implemented, for example, through air blowing or hot air using a dryer.

When the method for manufacturing the recycled polyester includes a step of removing the polyamide resin, the content of the polyamide resin in the resultant recycled polyester is preferably less than 1 mass %, more preferably less than 0.8 mass %, and even more preferably less than 0.6 mass %. By reducing the content of the polyamide resin in this manner, the quality of the recycled polyester becomes favorable.

EXAMPLES

The present invention will be described more specifically hereinafter using Examples and Comparative Examples, but the present invention is not limited to these examples.

[Raw Materials]

The polyester resins, yellowing inhibitors and greening inhibitors used in Examples and Comparative Examples were as follows. Furthermore, a polyamide resin manufactured in the following Manufacturing Example 1 was used as the polyamide resin.

<Polyester Resin (X1)>

Isophthalic acid copolymerized polyethylene terephthalate (intrinsic viscosity: 0.83 dL/g, melting point: 248° C.), trade name: BK2180, available from Mitsubishi Chemical Corporation <Yellowing Inhibitor>

Blue RR: Solvent Blue 97 (anthraquinone-based dye), trade name: MACROLEX Blue RR Gran, available from Lanxess AG Blue 690: Solvent Blue 104 (anthraquinone-based dye), trade name: Oracet Blue 690, available from BASF SE <Greening Inhibitor>

Violet 3R: Solvent Violet 36 (anthraquinone-based dye), trade name: MACROLEX Violet 3R Gran, available from Lanxess AG Red B: Solvent Red 195 (azo-based dye), trade name: MACROLEX Red B, available from Lanxess AG <Polyamide Resin (Y1)>

Manufacturing Example 1 (Manufacturing of Polyamide Resin (Y1))

A reaction container having an internal volume of 50 liters and equipped with a stirrer, a partial condenser, a total condenser, a thermometer, a dropping funnel, a nitrogen introduction tube, and a strand die was filled with precisely weighed materials including 15000 g (102.6 mol) of adipic acid, 13.06 g (123.3 mmol, 151 ppm as a phosphorus atom concentration in the polyamide) of sodium hypophosphite monohydrate ($NaH_2PO_2 \cdot H_2O$), and 6.849 g (83.49 mmol, 0.68 as a ratio of the number of moles with respect to the sodium hypophosphite monohydrate) of sodium acetate, and then sufficiently subjected to nitrogen purging, after which the contents of the system were heated to 170° C. while stirring under a small nitrogen stream. Next, 13896 g (102.0 mol, 0.994 as a charged molar ratio) of meta-xylylenediamine was added dropwise under stirring, and the temperature inside the system was continuously increased while removing condensed water that was produced to outside of the system. After the completion of dropwise addition of the meta-xylylenediamine, the reaction was continued for 40 minutes at an internal temperature of 260° C. Subsequently, the inside of the system was pressurized with nitrogen, and the produced polymer was extracted from the strand die and pelletized to afford approximately 24 kg of polyamide.

Next, the polyamide was inserted into a jacketed tumble dryer provided with a nitrogen gas introduction tube, a vacuum line, a vacuum pump, and a thermocouple for measuring the internal temperature, and the inside of the tumble dryer was sufficiently purged with nitrogen gas having a purity of 99 vol % or higher while the tumble dryer was rotated at a constant speed, after which the tumble dryer was heated under the same nitrogen gas stream, and the pellet temperature was increased to 150° C. over approximately 150 minutes. When the pellet temperature reached 150° C., the pressure inside the system was reduced to 1 torr or less. Heating was continued, and after the pellet temperature was increased to 200° C. over approximately 70 minutes, the temperature was maintained at 200° C. for 30 to 45 minutes. Next, nitrogen gas having a purity of 99 vol % or higher was introduced into the system, and the tumble dryer was cooled while being rotated, and a polyamide resin (Y1) was produced. The terminal amino group concentration was measured, and was found to be 14.4 μmol/g.

<Polyamide Resin Mixture>

Manufacturing Example 2 (Manufacturing of Polyamide Resin Mixture Through Dry Blending)

The polyamide resin (Y1) and a yellowing inhibitor and a greening inhibitor indicated in Table 1 were inserted into a blender at the mass ratios noted in Table 1 and then dry blended at 25° C., and a polyamide resin mixture was prepared.

Manufacturing Examples 3 to 8 (Manufacturing of Polyamide Resin Mixture by Masterbatch Method)

The polyamide resin for the masterbatch (polyamide resin (Y1)), a yellowing inhibitor (Blue RR or Blue 690), and a greening inhibitor (Violet 3R or Red B) were dry blended in advance at the proportions shown in Table 1. Next, the dry blended mixture was melt-kneaded at 260° C. using a twin-screw extruder (TEM26SX available from Toshiba Machine Co., Ltd.), and masterbatch pellets were produced. Subsequently, the pellets were dried in a vacuum dryer at 150° C. for 5 hours to produce a masterbatch.

Next, a polyamide resin mixture was prepared by mixing the produced masterbatch and the remaining polyamide resin (Y1) at a ratio of masterbatch/(remaining polyamide resin)=10/90 so as to afford the mass ratio indicated in Table 1.

Manufacturing Example 9 (Manufacturing of Polyamide Resin Mixture by the Full Compounding Method)

A polyamide resin mixture was prepared by introducing the polyamide resin (Y1) and a yellowing inhibitor and a greening inhibitor indicated in Table 1 into a twin-screw extruder at the mass ratios noted in Table 1, kneading at 260° C., and pelletizing the kneaded mixture.

[Multilayer Hollow Container]

Examples 1 to 13 and Comparative Examples 1 to 4 (Manufacturing of Multilayer Hollow Containers)

<Preform Molding>

A three-layer preform (25 g equivalent setting per preform) including a polyester layer/polyamide layer/polyester layer was injection molded and manufactured using an injection molding machine (model DU130CI, available from Sumitomo Heavy Industries, Ltd.) having two injection cylinders, and a two-piece mold (available from Kortec, Inc.). The polyester resin (X1) was injected from one injection cylinder, and the polyamide resin mixture produced in Manufacturing Examples 2 to 9 (Examples 1 to 13 and Comparative Example 4), the polyester resin (X1) (Comparative Example 1), or the polyamide resin (Y1) (Comparative Examples 2 and 3) was injected from the other injection cylinder. The molding conditions were as described below, and were set such that the mass of the polyamide layer relative to the entire preform was as indicated in Table 1, and the position at which the polyamide layer was present after bottle molding was as described in Table 1. Specifically, the position of the polyamide layer was adjusted by delaying the filling start time of the polyamide resin mixture or polyamide resin constituting the polyamide layer so as to be later than the filling start time of the polyester resin (X1) constituting the polyester layer. The shape of the preform included an overall length of 95 mm, an outer diameter of 22 mm, and a wall thickness of 4.0 mm. The molding conditions for the three-layer preform were as presented below.

Furthermore, in Examples 1 to 13 and Comparative Example 4, the degree of adherence of the yellowing inhibitor and greening inhibitor to the hopper was evaluated after the preform was molded. The results are shown in Table 1.

Skin-side injection cylinder temperature: 285° C.

Core-side injection cylinder temperature (only for three-layer preform): 265° C.

Resin flow path temperature in the mold: 285° C.

Mold cooling water temperature: 15° C.

Cycle time: 40 seconds

<Bottle Molding>

The produced preform was biaxially stretched and blow molded using a blow molding device (EFB1000ET, available from Frontier Inc.), and a bottle (multilayer hollow container) was produced. The overall length of the bottle was 223 mm, the outer diameter was 65 mm, the thickness of the trunk section was 350 μm, the internal volume was 500 mL, and the bottom surface was petaloid shaped. No dimples were provided in the trunk section. The biaxial stretching and blow molding conditions are as shown below.

The bottles (multilayer hollow containers) produced in the Examples and Comparative Examples were subjected to a bleaching agent storage test and a side impact test to evaluate bleaching agent resistance (cracking resistance) and delamination resistance. The results are shown in Table 1.

Preform heating temperature: 103° C.

Stretching rod pressure: 0.7 MPa

Primary blow pressure: 1.1 MPa

Secondary blow pressure: 2.5 MPa

Primary blow delay time: 0.30 seconds

Primary blow time: 0.30 seconds

Secondary blow time: 2.0 seconds

Blow exhaust time: 0.6 seconds

Mold temperature: 30° C.

[Measurement Method]

<Presence Position of Polyamide Layer>

As for the position at which the polyamide was present in the multilayer bottle produced in each of the Examples and Comparative Examples, the multilayer bottle was cut in the stretching direction, iodine tincture was dripped onto the cross section to stain the polyamide layer, and the position of polyamide layer was confirmed.

Note that the upper end position of the polyamide layer (the height from the ground contact portion where the polyamide layer is present; expressed as a percentage with the container height defined as 100%) was determined by measuring the cross section at three places and averaging the measured values.

In Table 1, a case in which the polyamide layer was present in the entire bottom surface was indicated by "yes", a case in which the polyamide layer was present in a portion of the bottom surface was indicated by "partially", and a case in which the polyamide layer was not present in the bottom surface was indicated by "no".

<Adherence Degree of Yellowing Inhibitor>

The adherence degree of the yellowing inhibitor was measured by the following method and evaluated according to the following criteria.

The adherence degree of the yellowing inhibitor to the hopper filled with the polyamide resin mixture was visually confirmed after 10 kg of preforms were molded in accordance with the details described in [Preform Molding] above. A lower adherence of the yellowing inhibitor to the hopper indicated a more efficient introduction of the yellowing inhibitor into the multilayer container.

A: Adherence of the yellowing inhibitor to the hopper could not be confirmed.

B: Adherence of the yellowing inhibitor to the hopper was confirmed.

<Adherence Degree of Greening Inhibitor>

The adherence degree of the greening inhibitor was measured by the following method and evaluated according to the following criteria.

The adherence degree of the greening inhibitor to the hopper filled with the polyamide resin mixture was visually confirmed after 10 kg of preforms were molded in accordance with the details described in [Preform Molding] above. A lower adherence of the greening inhibitor to the hopper indicated a more efficient introduction of the greening inhibitor into the multilayer container.

A: Adherence of the greening inhibitor to the hopper could not be confirmed.

B: Adherence of the greening inhibitor to the hopper was confirmed.

<Bleaching Agent Storage Test (Bleaching Agent Resistance (Cracking Resistance))>

The multilayer bottles produced in the Examples and Comparative Examples were each filled with a bleaching agent (Kitchen Haiter (available from Kao Corporation, containing a sodium alkyl ether sulfate)) and stored in a 40° C. environment for six months. Resistance to the bleaching agent was evaluated by the presence or absence of cracks generated in the bottle during the storage period. Those multilayer bottles in which cracks did not occur were determined to excel in resistance to the bleaching agent. The evaluation was conducted with two types of bleaching agents, namely a bleaching agent having a hypochlorous acid concentration of 6% (stock solution) and a bleaching agent having a hypochlorous acid concentration of 3% (half diluted with water).

None: No cracking occurred after storage.

Yes: Cracking occurred after storage.

<Side Impact Test (Delamination Resistance)>

Each multilayer bottle produced in the Examples and Comparative Examples was filled with 500 mL of carbonated water and stored in a 23° C., 50% RH environment for one week. A side impact tester (a device in which a 3 kg weight was attached to a tip end of a pendulum, and the pendulum was dropped from a position of 90° with respect to the bottle to subject the trunk section of the bottle to an impact) was then used to repeatedly impact the trunk section of the bottle. The delamination resistance of the multilayer bottle was evaluated based on the peeling state after the impact test was implemented 30 times. A lesser amount of peeling indicated more excellent delamination resistance.

A: No peeling occurred after completing the impact test 30 times.

B: Peeling occurred after completing the impact test 30 times, and the length of the peeling width in the longitudinal direction was within 3.0 cm.

C: Peeling occurred after completing the impact test 30 times, and the length of the peeling width in the longitudinal direction exceeded 3.0 cm.

[Manufacturing of Recycled Polyester]

<Recovery and Granulation Step>

Ten kilograms of the hollow multilayer containers produced in Examples 1 to 13 and Comparative Examples 1 to 4 were ground with a grinder having a mesh diameter of 8 mm, and the resulting flake-shaped ground product was recovered as recycled polyester.

The recovered recycled polyester was extruded and formed into a strand shape by a twin-screw extruder (TEM26SX, available from Toshiba Machine Co., Ltd.) at a heater temperature of 270° C. and a discharge rate of 20 kg/hr, and then cut with a pelletizer and formed into pellets while being cooled in a water tank. Note that in Examples 1 to 13 and Comparative Examples 2 to 4, air elutriation of the polyamide layer was not implemented.

<Crystallization/Solid Phase Polymerization Step>

The pellets produced in the granulation step were heated at 200° C. for 7 hours under vacuum conditions with the pressure reduced to 1 torr or less. The pellets were removed after the heating treatment, and the yellow chromaticity Δb*, the green chromaticity Δa*, and the Δhaze were evaluated. The results are shown in Table 1.

[Measurement Method]

<Yellow Chromaticity Δb*>

The yellow chromaticity Δb* of recycled polyester pellets produced in the [Manufacturing of recycled polyester] was measured according to the following method and evaluated by the following criteria.

In accordance with JIS Z 8722, the pellets were poured into a 30 mmφ cell container, and the color tone of the pellets was measured four times by the reflection method using the color difference meter ZE-2000 (a 12 V, 20 W halogen lamp light source available from Nippon Denshoku Industries Co., Ltd.), and the average value thereof was determined and used as the color tone.

Note that the b* value represents the chromaticity. A+b* represents a yellow direction, and a −b* represents a blue direction. Also, a smaller absolute value of the Δb* value means a greater suppression of yellowing. The smaller absolute value also means a higher level of achromaticity. The Δb* value indicates a difference between the b* value of a sample from the Examples and Comparative Examples and the b* value of the polyester resin alone (bottle of Comparative Example 1), subjected to the same treatment as in the Examples and Comparative examples.

<Green Chromaticity Δa*>

The green chromaticity Δa* of recycled polyester pellets produced in the [Manufacturing of recycled polyester] was measured according to the following method and evaluated by the following criteria.

In accordance with JIS Z 8722, the pellets were poured into a 30 mmφ cell container, and the color tone of the pellets was measured four times by the reflection method using the color difference meter ZE-2000 (a 12 V, 20 W halogen lamp light source available from Nippon Denshoku Industries Co., Ltd.), and the average value thereof was determined and used as the color tone.

Note that the a* value represents the chromaticity. A+a* represents a red direction, and a −a* represents a green direction. Also, a smaller absolute value of the Δa* value means a greater suppression of greening. The smaller absolute value also means a higher level of achromaticity. The Δa* value indicates a difference between the a* value of a sample from the following Examples and Comparative Examples and the a* value of the polyester resin alone (bottle of Comparative Example 1), subjected to the same treatment as in the Examples and Comparative Examples.

<ΔHaze>

A plate was molded as follows, and the Δhaze of the resulting plate was measured.

(Plate Molding)

Recycled polyester pellets produced by the above-described [Manufacturing of recycled polyester] were injected using an injection molding machine (model SE130DU-HP, available from Sumitomo Heavy Industries, Ltd.) having an injection cylinder, and a plate was manufactured by injection molding under the conditions indicated below. The shape of the plate was 60 mm long, 90 mm wide, and 3.0 mm thick. The plate molding conditions were as follows.

Injection cylinder temperature: 280° C.

Mold cooling water temperature: 15° C.

Cycle time: 45 seconds (Measurement and Evaluation of ΔHaze)

The Δhaze was measured according to the following method and evaluated by the following criteria.

On the basis of JIS K 7136, the haze of the plate was measured four times using a haze meter COH 7700 (available from Nippon Denshoku Industries Co., Ltd.) and the average value thereof was used as the haze value.

The Δhaze is a value calculated by subtracting the haze of the polyester resin alone subjected to the same treatment as in the Examples and Comparative Examples from the haze of the sample of Examples and Comparative Examples. A smaller Δhaze value indicates better transparency of the recycled polyester.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Polyamide resin mixture | Manufacturing Example No | | 2 | 3 | 4 | 4 | 4 | 4 | 5 | 6 | 4 |
| | Mixture manufacturing method | | Dry blending method | Masterbatch method | | | | | | | |
| | Polyamide resin for masterbatch (mass %) | Polyamide resin (Y1) | — | 9.986 | 9.96 | 9.96 | 9.96 | 9.96 | 9.98 | 9.98 | 9.96 |
| | Polyester resin for masterbatch (mass %) | Polyester resin (X1) | — | — | — | — | — | — | — | — | — |
| | Yellowing inhibitor (mass %) | Blue RR | 0.02 | 0.007 | 0.02 | 0.02 | 0.02 | 0.02 | 0.02 | — | 0.02 |
| | | Blue 690 | — | — | — | — | — | — | — | 0.02 | — |
| | Greening inhibitor (mass %) | Violet 3R | 0.02 | 0.007 | 0.02 | 0.02 | 0.02 | 0.02 | — | — | 0.02 |
| | | Red B | — | — | — | — | — | — | — | — | — |
| | Polyamide resin (Y1) (mass %) | | 99.96 | 90 | 90 | 90 | 90 | 90 | 90 | 90 | 90 |
| | Total (mass %) | | 100 | 100 | 100 | 100 | 100 | 100 | 100 | 100 | 100 |

TABLE 1-continued

| | | | | | | | | | | | |
|---|---|---|---|---|---|---|---|---|---|---|---|
| Multilayer container | Polyamide layer (mass %) | Polyamide resin mixture or polyamide resin (Y1) | 3 | 3 | 3 | 3 | 1.5 | 6 | 3 | 3 | 5 |
| | Polyester layer (mass %) | Polyester resin (X1) | 97 | 97 | 97 | 97 | 98.5 | 94 | 97 | 97 | 95 |
| | Total (mass %) | | 100 | 100 | 100 | 100 | 100 | 100 | 100 | 100 | 100 |
| | Presence position of polyamide layer | Bottom surface | Yes | Yes | Yes | Yes | Yes | Yes | Yes | Yes | Yes |
| | | Polyamide layer position (from ground contact portion) | 30% | 30% | 30% | 30% | 30% | 30% | 30% | 30% | 30% |
| | Yellowing inhibitor amount | (ppm) | 6 | 2 | 6 | 6 | 3 | 12 | 6 | 6 | 10 |
| | Greening inhibitor amount | (ppm) | 6 | 2 | 6 | 6 | 3 | 12 | — | — | 10 |
| Evaluation | Bleaching agent storage test | Sodium hypochlorite concentration (mass %) | 6.0 | 6.0 | 3.0 | 6.0 | 6.0 | 6.0 | 6.0 | 6.0 | 6.0 |
| | | Crack presence | No | No | No | No | No | No | No | No | No |
| | Side impact test | | A | A | A | A | A | A | A | A | A |
| | Yellow chromaticity Δb* | | 0.4 | 4.8 | 0.5 | 0.5 | 0.2 | 0.9 | 0.8 | 0.9 | 0.9 |
| | Green chromaticity Δa* | | 0.6 | 0.3 | 0.6 | 0.6 | 0.3 | 1.3 | 5.1 | 5.6 | 0.9 |
| | ΔHaze | % | 0.5 | 0.5 | 0.6 | 0.6 | 0.3 | 0.9 | 0.5 | 0.5 | 0.7 |
| | Adherence degree of yellowing inhibitor | | B | A | A | A | A | A | A | A | A |
| | Adherence degree of greening inhibitor | | B | A | A | A | A | A | — | — | A |

| | | | Examples | | | | Comparative Examples | | | |
|---|---|---|---|---|---|---|---|---|---|---|
| | | | 10 | 11 | 12 | 13 | 1 | 2 | 3 | 4 |
| Polyamide resin mixture | Manufacturing Example No | | 7 | 8 | 4 | 9 | — | — | — | 4 |
| | Mixture manufacturing method | | Masterbatch method | | | Full compounding method | — | (Polyamide resin (Y1) alone) | | Masterbatch method |
| | Polyamide resin for masterbatch (mass %) | Polyamide resin (Y1) | 9.96 | — | 9.96 | — | — | — | — | 9.96 |
| | Polyester resin for masterbatch (mass %) | Polyester resin (X1) | — | 9.96 | — | — | — | — | — | — |
| | Yellowing inhibitor (mass %) | Blue RR | 0.02 | 0.02 | 0.02 | 0.02 | — | — | — | 0.02 |
| | | Blue 690 | — | — | — | — | — | — | — | — |
| | Greening inhibitor (mass %) | Violet 3R | — | 0.02 | 0.02 | 0.02 | — | — | — | 0.02 |
| | | Red B | 0.02 | — | — | — | — | — | — | — |
| | Polyamide resin (Y1) (mass %) | | 90 | 90 | 90 | 99.96 | — | 100 | 100 | 90 |
| | Total (mass %) | | 100 | 100 | 100 | 100 | — | 100 | 100 | 100 |
| Multilayer container | Polyamide layer (mass %) | Polyamide resin mixture or polyamide resin (Y1) | 5 | 3 | 3 | 3 | — | 3 | 3 | 3 |
| | Polyester layer (mass %) | Polyester resin (X1) | 95 | 97 | 97 | 97 | 100 | 97 | 97 | 97 |
| | Total (mass %) | | 100 | 100 | 100 | 100 | 100 | 100 | 100 | 100 |
| | Presence position of polyamide layer | Bottom surface | Yes | Yes | Yes | Yes | No | Yes | Yes | Yes |
| | | Polyamide layer position (from ground contact portion) | 30% | 30% | 50% | 30% | — | 30% | 100% | 100% |
| | Yellowing inhibitor amount | (ppm) | 10 | 6 | 6 | 6 | — | — | — | 6 |
| | Greening inhibitor amount | (ppm) | 10 | 6 | 6 | 6 | — | — | — | 6 |
| Evaluation | Bleaching agent storage test | Sodium hypochlorite concentration (mass %) | 6.0 | 6.0 | 6.0 | 6.0 | 6.0 | 6.0 | 6.0 | 6.0 |
| | | Crack presence | No | No | No | No | Yes | No | Yes | Yes |

TABLE 1-continued

| | | | | | | | | |
|---|---|---|---|---|---|---|---|---|
| Side impact test | A | A | B | A | — | A | C | C |
| Yellow chromaticity Δb* | 0.9 | 0.7 | 0.5 | 0.7 | — | 7.2 | 7.1 | 0.6 |
| Green chromaticity Δa* | 0.8 | 0.7 | 0.6 | 0.6 | — | 1.5 | 1.2 | 0.6 |
| ΔHaze % | 0.7 | 0.8 | 0.6 | 0.7 | — | 1.4 | 1.2 | 0.6 |
| Adherence degree of yellowing inhibitor | A | A | A | A | — | — | — | A |
| Adherence degree of greening inhibitor | A | A | A | A | — | — | — | A |

As shown in Table 1, the multilayer hollow containers of Examples 1 to 13 exhibited both resistance to a bleaching agent (cracking resistance) and delamination resistance, and demonstrated that by adding a small amount of a yellowing inhibitor to the polyamide layer, yellowing of the recycled polyester when recycled can be suppressed. Furthermore, these multilayer hollow containers of Examples 1 to 13 also demonstrated that by adding a greening inhibitor to the polyamide layer, greening of the recycled polyester when recycled can be suppressed, and excellent transparency can be achieved.

In addition, as with the multilayer hollow containers of Examples 2 to 12, when the masterbatch method was used as the method for preparing the polyamide resin mixture constituting the polyamide layer, there was no adherence of the yellowing inhibitor and greening inhibitor to the hopper, and therefore manufacturing was facilitated, and yellowing of the recycled polyester when recycled was suppressed.

REFERENCE SIGNS LIST

1*a*, 1*b*: Multilayer container (concave bottom surface)
2*a*, 2*b*: Multilayer container (convex bottom surface)
11, 21: Neck section
12, 13, 22, 23: Trunk section
14: Ground contact portion
15: Bottom surface
24: Ground contact portion and part of bottom surface
25: Part of bottom surface

The invention claimed is:

1. A multilayer hollow container comprising:
a polyester layer containing a polyester resin (X); and
a polyamide layer containing a polyamide resin (Y) and a yellowing inhibitor (A), the polyamide layer being an intermediate layer, and the polyamide layer being present from a ground contact portion of the multilayer hollow container to a position of from 10 to 70% of a height of the multilayer hollow container.

2. The multilayer hollow container according to claim 1, wherein the polyamide resin (Y) comprises a constituent unit derived from a diamine and a constituent unit derived from a dicarboxylic acid, 80 mol % or more of the constituent unit derived from a diamine being a constituent unit derived from xylylene diamine, and 80 mol % or more of the constituent unit derived from a dicarboxylic acid being a constituent unit derived from adipic acid.

3. The multilayer hollow container according to claim 1, wherein a content of the polyamide resin (Y) is from 0.05 to 7.0 mass % relative to a total amount of all polyamide layers and all polyester layers.

4. The multilayer hollow container according to claim 1, wherein the polyester resin (X) comprises a constituent unit derived from a dicarboxylic acid and a constituent unit derived from a diol, 80 mol % or more of the constituent unit derived from terephthalic acid, and 80 mol % or more of the constituent unit derived from a diol being a constituent unit derived from ethylene glycol.

5. The multilayer hollow container according to claim 1, wherein the yellowing inhibitor (A) is at least one selected from the group consisting of dyes and pigments.

6. The multilayer hollow container according to claim 1, wherein the content of the yellowing inhibitor (A) is from 1 to 30 ppm relative to the total amount of all polyamide layers and all polyester layers.

7. The multilayer hollow container according to claim 1, wherein the multilayer container has a 3 to 5 layer structure.

8. The multilayer hollow container according to claim 1, wherein the polyamide layer is substantially continuously present at least from the ground contact portion of the multilayer hollow container to a position of 10% of the height of the multilayer hollow container.

9. The multilayer hollow container according to claim 8, wherein the yellowing inhibitor (A) is an anthraquinone-based dye.

10. The multilayer hollow container according to claim 9, wherein the content of the yellowing inhibitor (A) is from 1 to 30 ppm relative to the total amount of all polyamide layers and all polyester layers, and the polyamide layer further comprises a greening inhibitor (B).

11. The multilayer hollow container according to claim 8, wherein the content of the yellowing inhibitor (A) is from 1 to 30 ppm relative to the total amount of all polyamide layers and all polyester layers.

12. The multilayer hollow container according to claim 8, wherein the polyamide layer further comprises a greening inhibitor (B).

13. The multilayer hollow container according to claim 1, wherein the yellowing inhibitor (A) is an anthraquinone-based dye.

14. The multilayer hollow container according to claim 13, wherein the polyamide layer further comprises a greening inhibitor (B).

15. The multilayer hollow container according to claim 1, wherein the polyamide layer further comprises a greening inhibitor (B).

16. The multilayer hollow container according to claim 15, wherein the greening inhibitor (B) is at least one selected from the group consisting of anthraquinone-based dyes and azo-based dyes.

17. A bleaching agent article comprising a chlorine-based liquid bleaching agent composition accommodated in the multilayer hollow container described in claim 1.

18. The bleaching agent article according to claim 17, wherein the chlorine-based liquid bleaching agent composition comprises from 0.5 to 15 mass % of sodium hypochlorite.

19. The bleaching agent article according to claim 17, wherein the chlorine-based liquid bleaching agent composition contains a surfactant.

20. The bleaching agent article according to claim 17, wherein the chlorine-based liquid bleaching agent composition contains an alkaline agent.

* * * * *